(12) United States Patent
Woodward et al.

(10) Patent No.: US 12,287,761 B2
(45) Date of Patent: Apr. 29, 2025

(54) SYSTEMS AND METHODS FOR MACHINE LEARNING-BASED CLASSIFICATION OF DIGITAL COMPUTER FILES USING FILE METADATA

(71) Applicant: DryvIQ, Inc., Ann Arbor, MI (US)

(72) Inventors: Steve Woodward, Canton, MI (US); Alexis Johnson, Canton, MI (US); Stefan Larson, Dexter, MI (US); Shaun Becker, Canton, MI (US)

(73) Assignee: DryvIQ, Inc., Ann Arbor, MI (US)

( * ) Notice: Subject to any disclaimer, the term of this patent is extended or adjusted under 35 U.S.C. 154(b) by 342 days.

(21) Appl. No.: 18/106,270

(22) Filed: Feb. 6, 2023

(65) Prior Publication Data
US 2023/0251999 A1 Aug. 10, 2023

Related U.S. Application Data

(60) Provisional application No. 63/328,711, filed on Apr. 7, 2022, provisional application No. 63/307,978, filed on Feb. 8, 2022.

(51) Int. Cl.
*G06F 16/16* (2019.01)
*G06F 16/11* (2019.01)

(52) U.S. Cl.
CPC .......... *G06F 16/164* (2019.01); *G06F 16/119* (2019.01)

(58) Field of Classification Search
CPC ............................ G06F 16/164; G06F 16/119
USPC ........................................................ 707/822
See application file for complete search history.

(56) References Cited

U.S. PATENT DOCUMENTS

| | | | |
|---|---|---|---|
| 11,531,640 B1 * | 12/2022 | Woodward | G06F 30/27 |
| 2018/0373722 A1 * | 12/2018 | Ulasen | G06N 3/045 |
| 2023/0185768 A1 * | 6/2023 | Inghelbrecht | G06N 3/08 |
| | | | 706/12 |

* cited by examiner

*Primary Examiner* — Loc Tran
(74) *Attorney, Agent, or Firm* — Padowithz Alce; Alce PLLC

(57) ABSTRACT

A system and method for accelerated content classification and routing of digital files in a data handling and data governance service includes identifying a digital computer file; sequentially routing the digital computer file to one or more machine learning-based content classification models of a plurality of distinct machine learning-based content classification models based on a service-defined model instantiation and execution sequence, wherein: the service-defined model instantiation and execution sequence defines a model instantiation and execution order for the plurality of distinct machine learning-based content classification models that enables a fast content classification of the digital computer file while minimizing a computation time or runtime of the one or more machine learning-based content classification models; computing, via a machine learning-based filename classification model, a content classification inference based on extracted filename feature data of the digital computer file; and executing one or more computer-executable instructions based on the content classification inference.

10 Claims, 13 Drawing Sheets

200

Constructing a Digital File Data Corpus S210

Transforming Filename Metadata S220

Generating a Filename Vocabulary Corpus and a Filename Feature Corpus S230

Generating One-Hot Encoded Filename Vectors S240

Generating a Corpus of Labeled One-Hot Encoded Filename Vectors and Training a Machine Learning-Based Filename Classification Model S250

Classifying Inbound Digital Files S260

FIGURE 2

| Digital Filename Metadata | Tokenized Filename | Capitalization-Equivalent Filename |
|---|---|---|
| John_Doe_Resume.pdf | [john, doe, resume, pdf] | john_doe_resume.pdf |
| JohnSmithResume.pdf | [john, smith, resume, pdf] | johnsmithresume.pdf |

FIGURE 9

SYSTEMS AND METHODS FOR MACHINE LEARNING-BASED CLASSIFICATION OF DIGITAL COMPUTER FILES USING FILE METADATA

CROSS-REFERENCE TO RELATED APPLICATIONS

This application claims the benefit of U.S. Provisional Application No. 63/307,978, filed 8 Feb. 2022, and U.S. Provisional Application No. 63/328,711, filed 7 Apr. 2022, which are incorporated in their entireties by this reference.

TECHNICAL FIELD

This invention relates generally to the data handling and data governance fields, and more specifically to new and useful systems and methods for machine learning-based classifications of data items for sensitivity-informed handling and governance in the data handling and data governance fields.

BACKGROUND

Evolving data security and data compliance risks are some of the factors that may be driving entities to take different approaches to handling their data including reorganizing their data from decentralized and often complex storage systems to centralized, cloud-based storage architectures. Additionally, misclassified digital items and unstructured digital items may further complicate attempts to successfully govern and/or manage digital items throughout any type of storage system.

In traditional on-premises data storage and nonintegrated or disjointed storage architectures, identifying data files and content that may include potentially sensitive information and further managing permissions for controlling access to files and content having high security threat and compliance risks can be especially difficult.

Thus, there are needs in the data handling and data governance fields to create improved systems and methods for intelligently handling data and providing intuitive data governance and controls that curtail the several data security and data compliance risks posed by legacy data storage and management architectures.

The embodiments of the present application described herein provide technical solutions that address, at least the needs described above.

BRIEF DESCRIPTION OF THE FIGURES

FIG. 2 illustrates an example method 200 in accordance with one or more embodiments of the present application;

FIG. 9 illustrates an example representation of one or more tokenized filenames and one or more capitalization-equivalent filenames in accordance with one or more embodiments of the present application;

BRIEF SUMMARY OF THE INVENTION(S)

Figure 1:
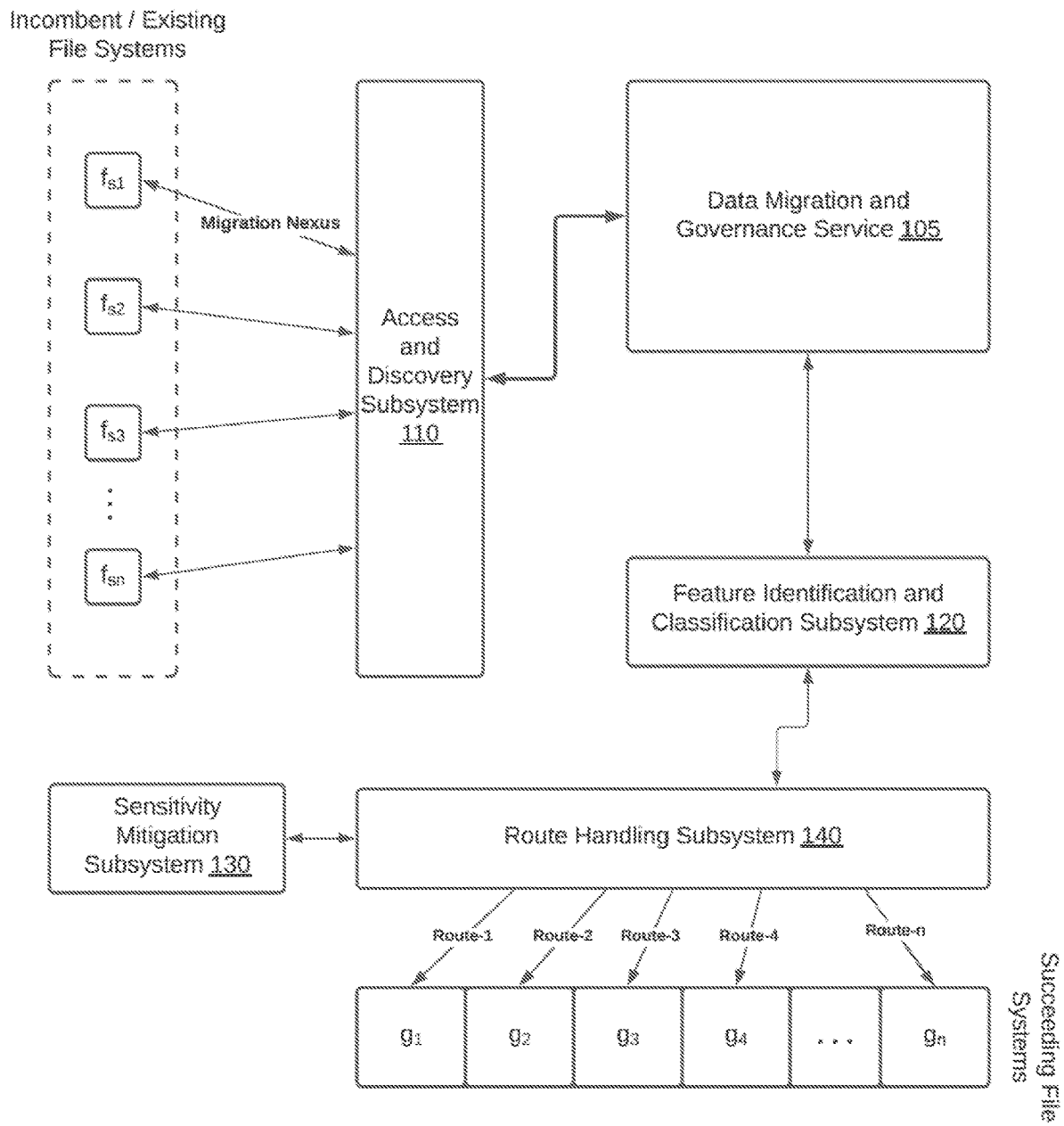
FIG. 1 illustrates a schematic representation of a system 100 in accordance with one or more embodiments of the present application.

In one embodiment, a machine learning-based method for accelerated content classification and routing of digital files in a data handling and data governance service includes identifying a digital computer file associated with a subscriber to the data handling and data governance service; sequentially routing the digital computer file to one or more machine learning-based content classification models of a plurality of distinct machine learning-based content classification models based on a service-defined model instantiation and execution sequence, wherein: (i) the service-defined model instantiation and execution sequence defines a model instantiation and execution order for the plurality of distinct machine learning-based content classification models that enables a fast content classification of the digital computer file while minimizing a computation time or runtime of the one or more machine learning-based content classification models; and (ii) the one or more machine learning-based content classification models include a machine learning-based filename classification model computing, via the machine learning-based filename classification model, a content classification inference based on extracted filename feature data of the digital computer file; and executing one or more computer-executable instructions based on the content classification inference, wherein executing the one or more computer-executable instructions includes one of: (a) a routing of the digital computer file to a subsequent machine learning-based content classification model based on the service-defined model instantiation and execution sequence if a content confidence value associated with the content classification inference fails to satisfy a minimum content classification threshold; and (b) a migration of the digital computer file to a target data storage repository if the content confidence value satisfies the minimum content classification threshold.

In one embodiment, the method includes wherein the extracted filename feature data comprises one or more features extracted from a filename identifying the digital computer file; computing the content classification inference includes: converting the extracted filename feature data to a filename vector representation; and providing the filename vector representation as model input to the machine learning-based filename classification model.

In one embodiment, the method includes wherein the machine learning-based filename classification model is configured to classify the digital computer file into one of a plurality of distinct digital file subdomain types; and each of the plurality of distinct digital file subdomain types is associated with a top-level digital file domain type.

In one embodiment, the method includes wherein the model instantiation and execution order for the plurality of distinct machine learning-based content classification models includes: the machine learning-based filename classification model at a foremost position in the service-defined model instantiation and execution sequence; a machine learning-based hierarchical classification model at a position downstream of the foremost position; and an enhanced machine learning-based document classification model at a position downstream of the foremost position.

In one embodiment, the method includes wherein the machine learning-based filename classification model comprises one of: a subscriber-agnostic filename classification model that is configured to classify the digital computer file into one of a plurality of distinct subscriber-agnostic digital file subdomain types based on the extracted filename feature data of the digital computer file; and a subscriber-specific machine learning-based filename classification model that is configured to classify the digital computer file into any one of the plurality of distinct subscriber-agnostic digital file subdomain types and a plurality of distinct subscriber-informed digital file subdomain types based on the extracted filename feature data of the digital computer file.

In one embodiment, the method includes wherein the machine learning-based filename classification model is the first machine learning-based content classification model of the plurality of distinct machine learning-based content classification models to be instantiated and executed in the service-defined model instantiation and execution sequence.

In one embodiment, the method further includes automatically identifying that the fast content classification of the digital computer file is successful based on determining that the content confidence value of the content classification inference computed by the machine learning-based filename classification model satisfies the minimum content classification threshold; and automatically terminating a routing of the digital computer file to one or more subsequent machine learning-based content classification models downstream of the machine learning-based filename classification model in the service-defined model instantiation and execution sequence based on the identifying.

In one embodiment, the method further includes automatically identifying that the fast content classification of the digital computer file is successful based on determining that the content confidence value of the content classification inference computed by the machine learning-based filename classification model satisfies the minimum content classification threshold; and automatically exiting the service-defined model instantiation and execution sequence based on the identifying, wherein: the exiting of the service-defined model instantiation and execution sequence bypasses or avoids instantiating and executing a set of machine learning-based content classification models subsequent or downstream of the machine learning-based filename classification model in the service-defined model instantiation and execution sequence.

In one embodiment, a machine learning-based method for accelerated content classification and routing of digital computer files in a data handling and data governance service includes receiving, via one or more computers, a digital computer file associated with a subscriber to the data handling and data governance service; instantiating, via the one or more computers, a machine learning-based filename classification model based on the identifying of the digital computer file; automatically generating, via the one or more computers, a one-hot encoded filename vector for the digital computer file based on the instantiation of the machine learning-based filename classification model, wherein the automatic generation of the one-hot encoded filename vector includes: (a) identifying a one-hot encoding filename scheme associated with the machine learning-based filename classification model; (b) assessing at least two distinct filename representations associated with a filename identifying the digital computer file against the one-hot encoding filename scheme; and (c) encoding the one-hot encoded filename vector based on the assessing; computing, via the machine learning-based filename classification model, a content classification inference based on providing the one-hot encoded filename vector as model input to the machine learning-based filename classification model; and executing, via the one or more computers, one or more digital computer file handling instructions for the digital computer file based on the content classification inference.

In one embodiment, the method includes wherein the at least two distinct filename representations include: (1) a tokenized filename representation associated with the filename of the digital computer file; and (2) a capitalization-equivalent filename representation associated with the filename of the digital computer file.

In one embodiment, the method further includes generating the tokenized filename representation based on the filename of the digital computer file, wherein generating the tokenized filename representation includes: implementing a tokenization engine that receives, as input, the filename of the digital computer file; and computing, via the tokenization engine, the tokenized filename representation based on one or more tokenization instructions of the tokenization engine.

In one embodiment, the method further includes generating the capitalization-equivalent filename representation based on the filename of the digital computer file, wherein generating the capitalization-equivalent filename representation includes: implementing a capitalization-equivalent filename engine that receives, as input, the filename of the digital computer file; and computing, via the capitalization-equivalent filename engine, the capitalization-equivalent filename representation based on one or more capitalization-equivalent instructions of the capitalization-equivalent filename engine.

In one embodiment, the method includes wherein the one-hot encoding filename scheme includes a plurality of distinct filename feature tokens; and assessing the at least two distinct filename representations against the one-hot encoding filename scheme includes: assessing the capitalization-equivalent filename representation against a first set of filename feature tokens of the one-hot encoding filename scheme greater than or equal to a predetermined filename feature token length; and assessing the tokenized filename representation against a second set of filename feature tokens of the one-hot encoding filename scheme less than the predetermined filename feature token length.

In one embodiment, the method includes wherein assessing the capitalization-equivalent filename representation against the first set of filename feature tokens of the one-hot encoding filename scheme greater than or equal to the predetermined filename feature token length includes: performing, via the one or more computers, one or more searches of the capitalization-equivalent filename to determine if a token substring is present in the capitalization-equivalent filename representation for each distinct filename feature token of the first set of filename feature tokens.

In one embodiment, the method includes wherein assessing the tokenized filename representation against the second set of filename feature tokens of the one-hot encoding filename scheme less than the predetermined filename feature token length includes: performing, via the one or more computes, one or more searches of the tokenized filename representation to determine if an exact token match exists or occurs in the tokenized filename representation for each distinct filename feature token of the second set of filename feature tokens.

In one embodiment, the method further includes training, via the one or more computers, the machine learning-based filename classification model based on a corpus of labeled one-hot encoded filename vectors, wherein the corpus of labeled one-hot encoded filename vectors includes a plurality of distinct labeled one-hot encoded filename vectors of one or more digital file types.

In one embodiment, the method includes wherein each of the plurality of distinct labeled one-hot encoded filename vectors include a plurality of distinct one-hot encoded elements, wherein one of the distinct one-hot encoded elements in the each of the plurality of distinct labeled one-hot encoded filename vectors relates to a time-informative indicative signal.

In one embodiment, the method includes wherein each of the plurality of distinct labeled one-hot encoded filename vectors include a plurality of distinct one-hot encoded elements, wherein: (i) one of the distinct one-hot encoded elements in the each of the plurality of distinct labeled one-hot encoded filename vectors relates to an accounting-informative indicative signal and (ii) one of the distinct one-hot encoded elements in the each of the plurality of distinct labeled one-hot encoded filename vectors relates to a gerund-informative indicative signal.

In one embodiment, a computer-implemented method for accelerated content classification and routing of digital files in a data handling and data governance service, the method comprising: identifying, by one or more computers, a digital computer file associated with a subscriber to the data handling and data governance service; routing, by the one or more computers, the digital computer file to one or more machine learning-based content classification models of a plurality of distinct machine learning-based content classification models based on a service-defined model instantiation and execution sequence, wherein (i) the service-defined model instantiation and execution sequence defines a model instantiation and execution order for the plurality of distinct machine learning-based content classification models that enables a fast classification of the digital computer file; and (ii) the one or more machine learning-based content classification models include a machine learning-based filename classification model; computing, via the machine learning-based filename classification model, a content classification inference based on extracted filename feature data of the digital computer file; and executing, by the one or more computers, one or more computer-executable instructions based on the content classification inference, wherein executing the one or more computer-executable instructions includes one of: (a) escalating the digital computer file to an enhanced machine learning-based content classification model subsequent to the machine learning-based filename classification model in the service-defined model instantiation and execution sequence if a content confidence value associated with the content classification inference fails to satisfy a minimum content classification threshold; and (b) disposing of the digital computer file into a target data storage repository if the content confidence value satisfies the minimum content classification threshold.

In one embodiment, the method further includes adjusting the minimum content classification threshold from a service-default minimum content classification threshold to a subscriber-informed minimum content classification threshold based on receiving an input from the subscriber that corresponds to increasing or decreasing the service-default minimum content classification threshold.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Intelligent Content Handling and Content Governance

As shown in FIG. 1, a system 100 for intelligent data handling and data governance includes a data handling and governance service 105, an access and discovery subsystem 110, a feature identification and classification subsystem 120, a sensitivity mitigation subsystem 130, and a content route handling subsystem 140, as described in U.S. patent application Ser. No. 17/849,555, which is incorporated herein in its entirety by this reference. The system 100 may sometimes be referred to herein as an intelligent data handling and data governance system 100 or simply the data handling system 100.

1.05 Intelligent Content Access+Content Handling Subsystem

The data handling and governance service 105, sometimes referred to herein as the "data handling service 105" may be implemented by a distributed network of computers and may be in operable and control communication with each of the subsystems of the system 100. That is, the data handling service 105 may include a centralized controlling computer server(s) and associated computing systems that encourages and/or controls the intelligent data handling, data classification, and data governance operations of each of the subsystems 110-140.

In one or more embodiments, the data handling service 105 may function to implement a data handling and data governance application programming interface (API) that enables programmatic communication and control between the data handling system 100 and the one or more sub-services therein and APIs of the one or more subscribers to the data handling service 105 of the data handling system 100.

1.1 Content Access+Discovery Subsystem

The access and discovery subsystem 110, which may be sometimes referred to herein as the "discovery subsystem"

or "discovery subservice", preferably functions to enable one or more electronic connections between the data handling system 100 and one or more external systems of one or more subscribers and/or one or more users to the data handling service 105. The discovery subsystem may include one or more access modules that may function to establish or create content communication channels, which are sometimes referred to as "migration nexus" or "data handling nexus", between the data handling system 100 and subscriber systems. In one or more embodiments, the data handling nexus may include any suitable medium and/or method of transmitting digital items between at least two devices including, but not limited to, a service bus, a digital communication channel or line, and/or the like.

Figure 4:
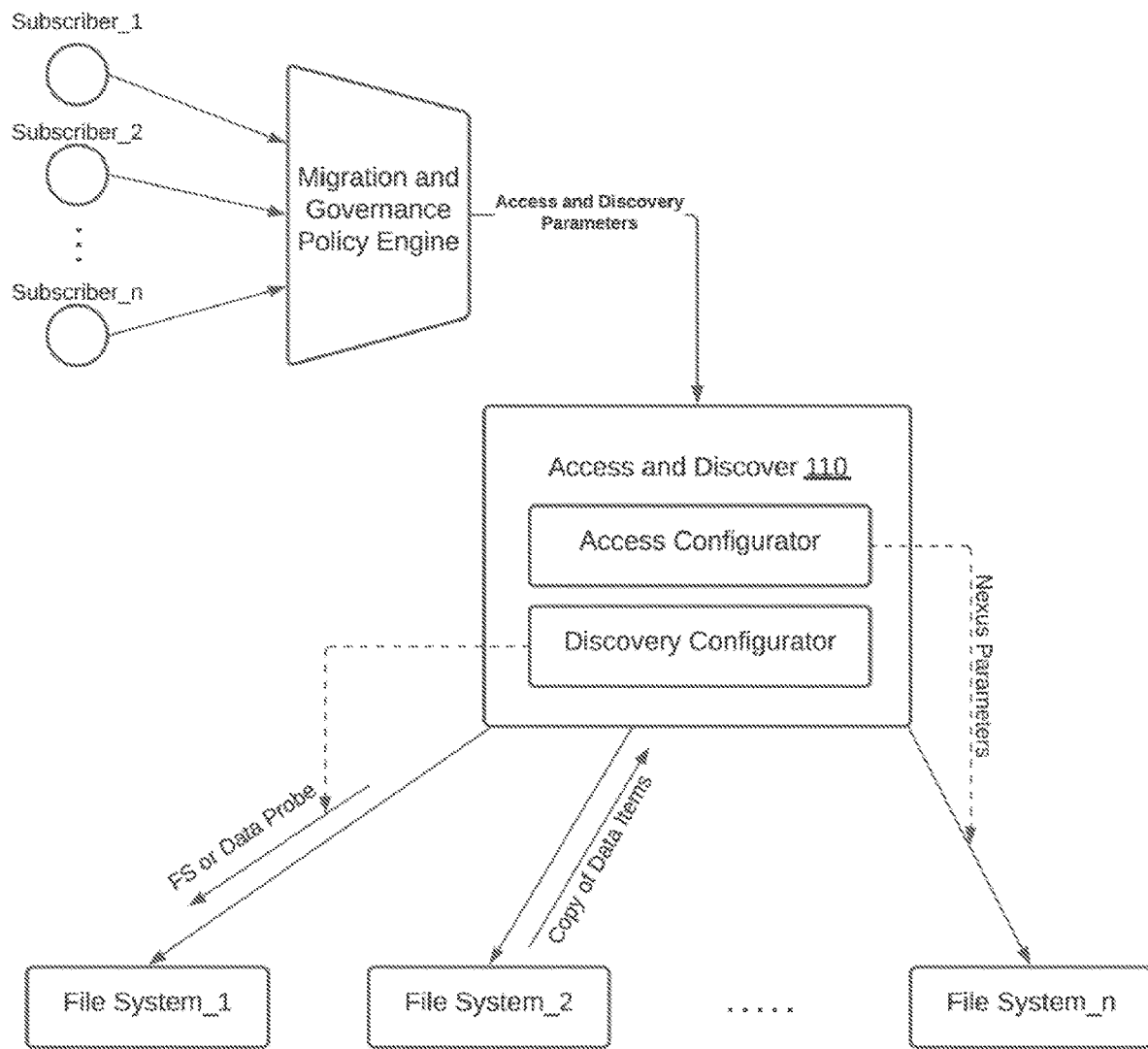
FIG. 4 illustrates a schematic representation of a second implementation of one or more sub-components of the system 100 in accordance with one or more embodiments of the present application.

The discovery subsystem 100 may additionally or alternatively include one or more discovery submodules that perform one or more content discovery actions and/or functions for identifying existing file and content systems within a computing architecture of a subscriber and/or user, as shown generally by way of example in FIG. 4.

1.2 Content Feature Identification and Classification Subsystem

Figure 5:
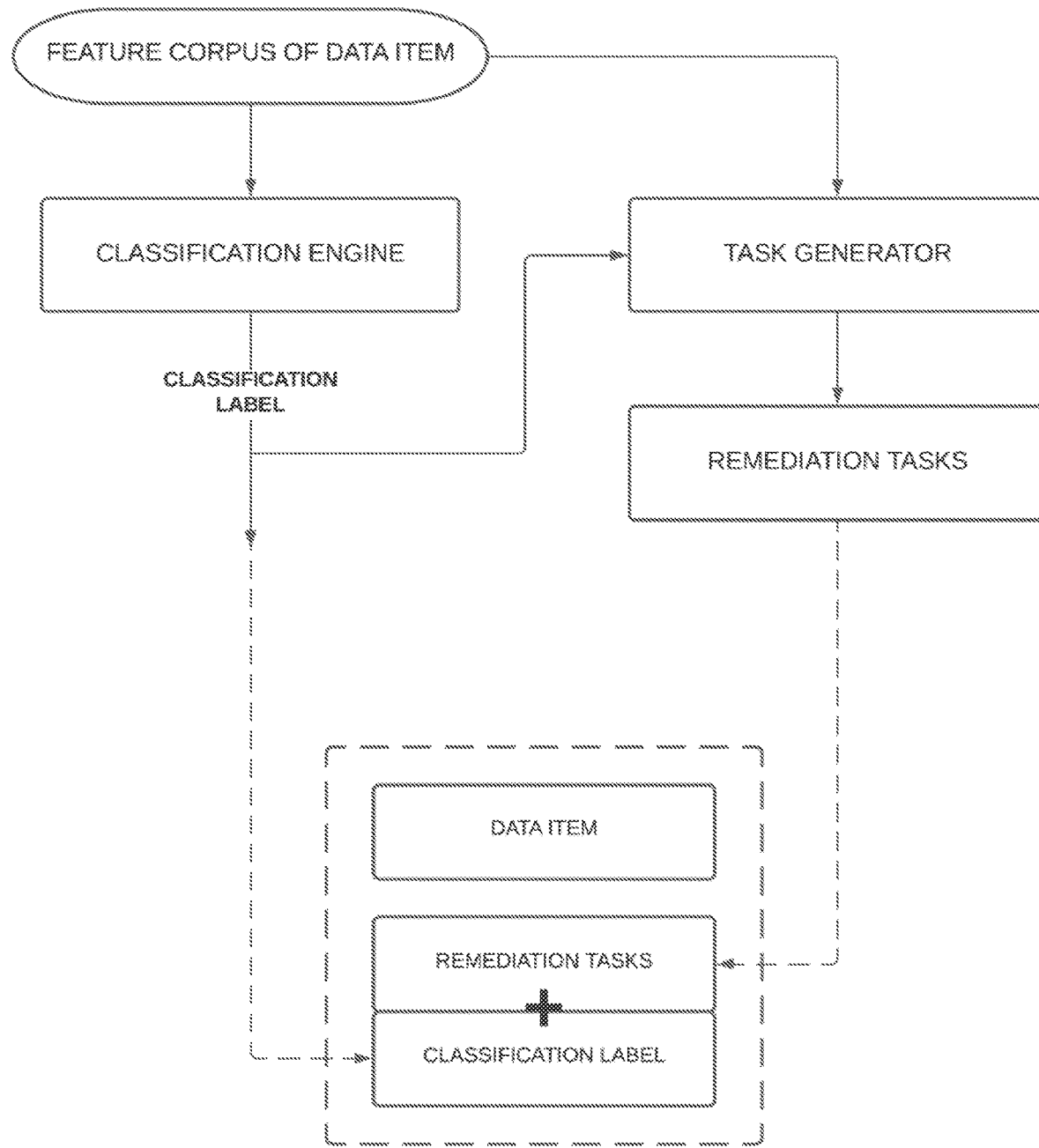
FIG. 5 illustrates a schematic representation of an example for generating action tasks for a data item in accordance with one or more embodiments of the present application.
Figure 6:
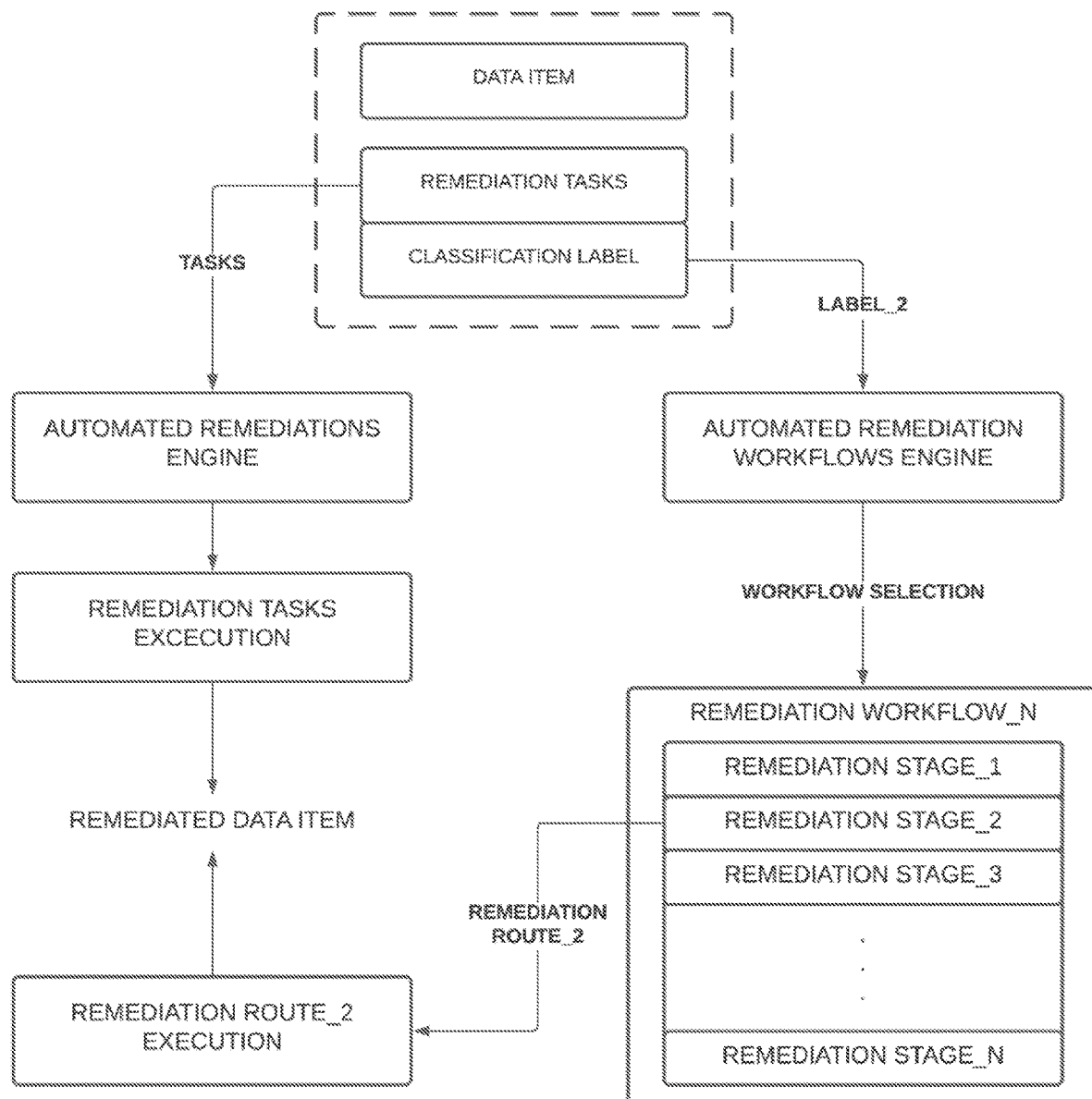
FIG. 6 illustrates a schematic representation of an example for implementing a remediation stage for handling a data item in accordance with one or more embodiments of the present application.

The feature identification and classification subsystem 120, which may sometimes be referred to herein as a "classification subsystem", preferably functions to compute one or more classification labels for each target file or target content being migrated and/or handled by the data handling system 100, as shown generally by way of example in FIG. 5 and FIG. 6.

Figure 3:
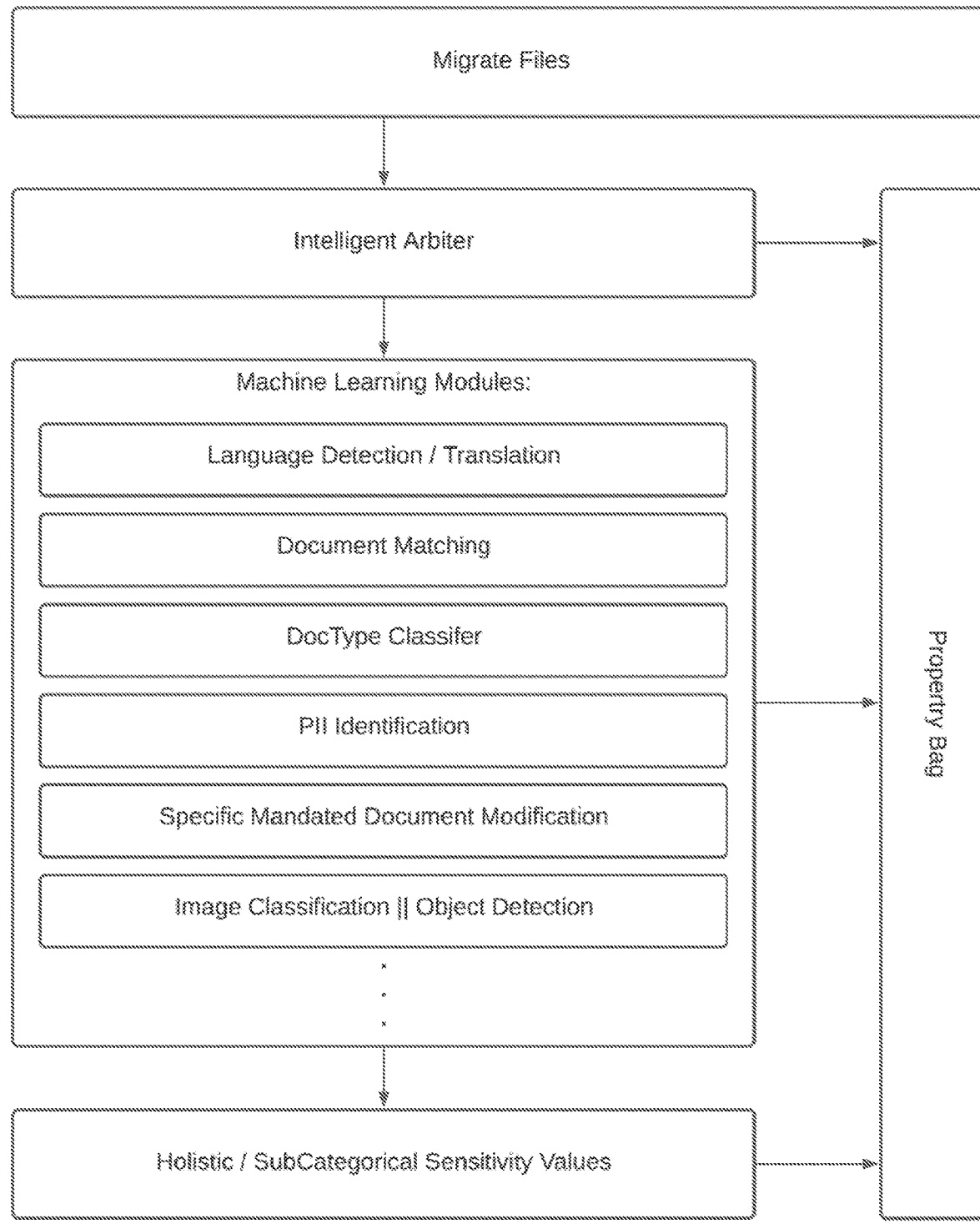
FIG. 3 illustrates a schematic representation of a first implementation of one or more sub-components of the system 100 in accordance with one or more embodiments of the present application.

In one or more embodiments, the classification subsystem 120 includes a machine learning module or subsystem that may be intelligently configured to predict various classifications for each target file or target document including, but not limited to, identifying a document type, identifying sensitive information, identifying a document's language (e.g., via a language detection model), identifying objects or images, identifying document form values, and/or the like. In such embodiments, the classification subsystem 100 may include a plurality of distinct machine learning-based classification submodules, which may be outlined herein below in the method 200 and as shown generally by way of example in FIG. 3.

Additionally, or alternatively, in some embodiments, the classification subsystem 100 may include one or more content classification modules that include extensible classification heuristics derived from one or more of subscriber-defined content policy and/or data handling service-derived content policy.

Additionally, or alternatively, the classification subsystem 100 may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Content Sensitivity Mitigation Subsystem

Figure 7:
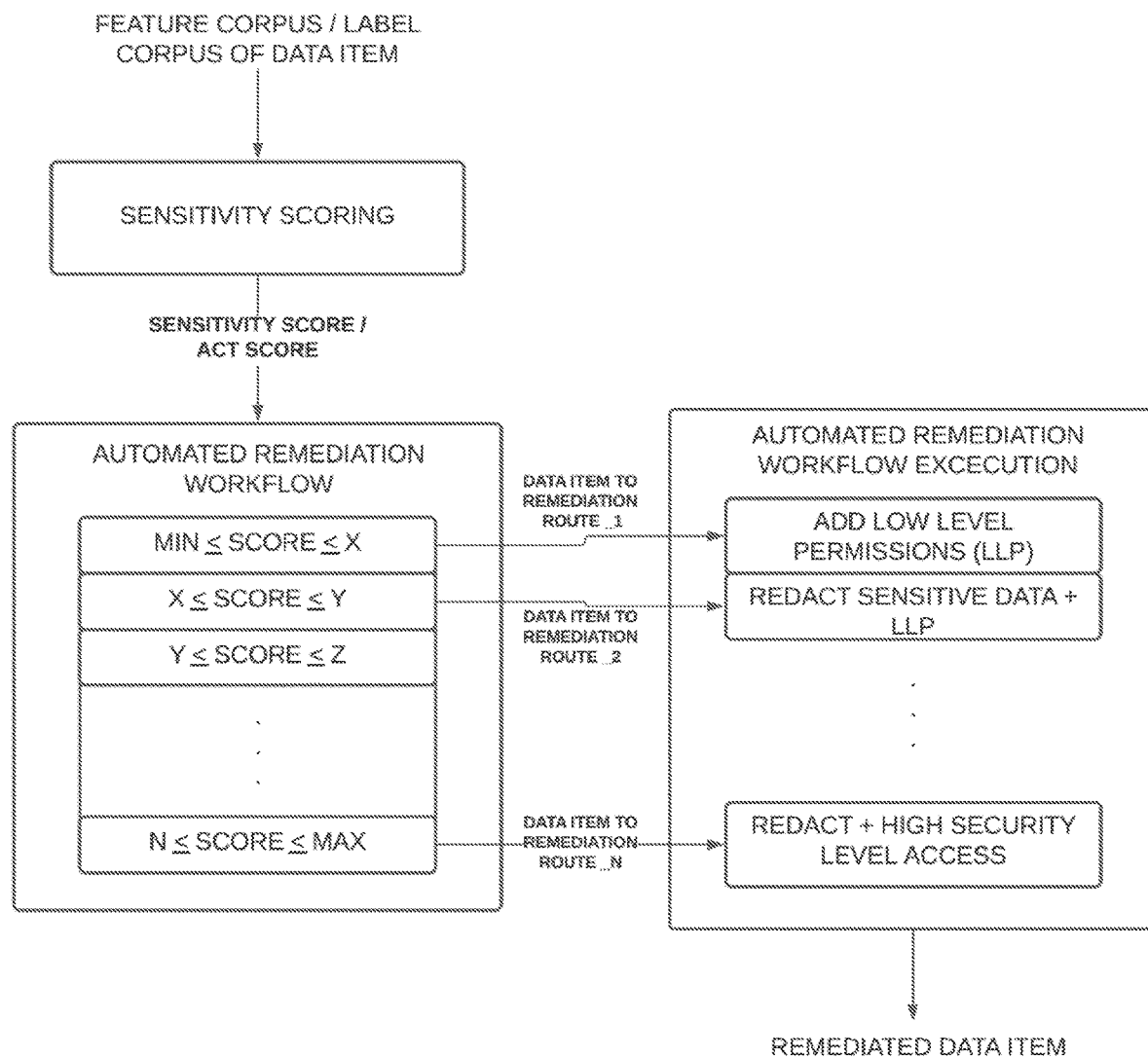
FIG. 7 illustrates a schematic representation of an example of implementing a sensitivity evaluation stage for handling a data item in accordance with one or more embodiments of the present application.

The sensitivity mitigation subsystem 130 preferably functions to perform one or more automated actions that reduces a sensitivity of a target file or target content or otherwise, improves a security of a target file or target content for protecting sensitive or secure content/information, as shown generally by way of example in FIG. 7. Sensitive information or data preferably relate to data that must be guarded from unauthorized access and unwarranted disclosure to maintain the information security of an individual or an organization. In one or more embodiments, sensitive information may be defined based on subscriber information security policy or file system policy. In some embodiments, sensitive information may be defined based on data handling service-defined file system policy.

The sensitivity mitigation subsystem 130 may include a plurality of distinct automated sensitivity mitigation workflows or the like to which a target file or target content may be intelligently routed based on classification data.

1.4 Automated Document Identification Module

The content route handling subsystem 140 preferably functions to intelligently route each target file or target content based on classification inferences or predictions of the classification subsystem 120. In some embodiments, a succeeding or new file system of a subscriber may include a predetermined configuration for ingesting and/or storing target digital items and content. In such embodiments, the content route handling subsystem 140 may be configured based on the storage parameters and/or configurations of the succeeding file system(s) and perform a routing of target files and target content to appropriate regions or partitions of the succeeding file system(s).

Additionally, or alternatively, the content route handling subsystem 140 may function to route distinct target files and/or target content to the sensitivity mitigation subsystem 130 based on the one or more features discovered and classifications of the classification subsystem 120.

1.5 Automated Training Sample Sourcing Subsystem

Figure 8:
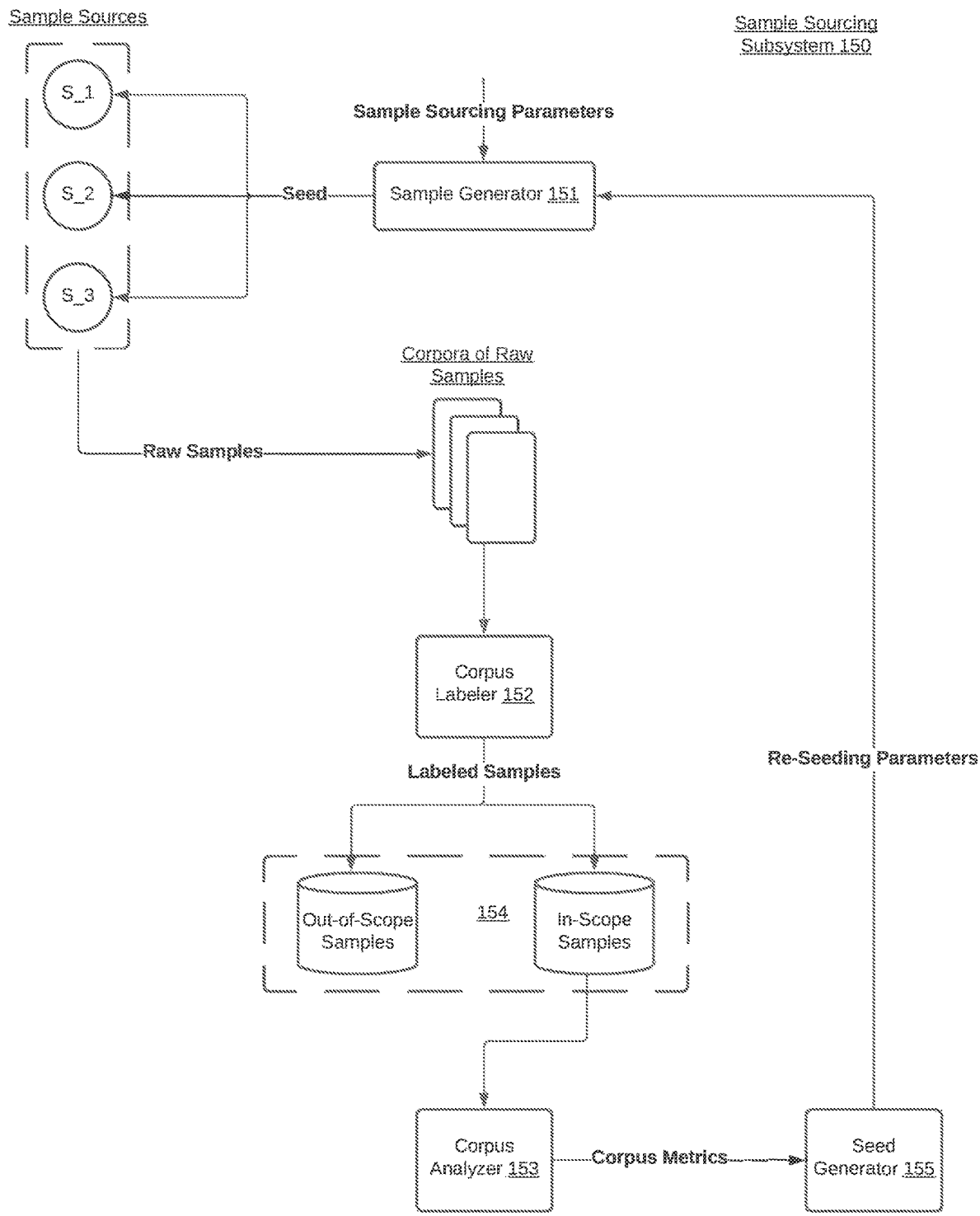
FIG. 8 illustrates a schematic representation of an example of a sample sourcing subsystem of the system 100 in accordance with one or more embodiments of the present application.

The automated training sample sourcing subsystem 150 preferably includes a document-image generator interface 151, a corpus annotations module 152, a training corpus analyzer (module) 153, one or more training sample repositories 154, and/or a seed/re-seed generator 155, as shown by way of example in FIG. 8. In a preferred embodiment, the automated training sample sourcing subsystem 150 may function to source document and/or image training data samples via a document-image generator 151 that may be in operable communication with a plurality of sources of training data samples. In a preferred embodiment, the document-image generator 151 may be seeded with sourcing parameters that may be used in generating requests for document and/or image training data sources to various of the plurality of sources of training data samples.

It shall be recognized that the document-image generator interface 151 may be interchangeably referred to herein as an image generator interface and may be additionally configured for sourcing corpora of image samples. It shall also be recognized that while in the description provided herein reference is preferably made to a sourcing and handling of document samples, the sourcing and handling of image samples should also be implied in each instance when not expressly described or mentioned.

The corpus annotations module 152 preferably functions to ingest a corpus of unlabeled document samples or image samples and compute classification labels and/or annotations for each distinct sample within a target corpus of document samples.

The training corpus analyzer (module) 153 preferably functions to evaluate one or more attributes of a corpus of document samples or image samples being sourced for training a target machine learning model. In one or more embodiments, the training corpus analyzer 153 may be configured to automatically compute one or more corpus metrics that indicate a likely level of efficacy of a target corpus of training data samples for potentially training a target machine learning model on a specific task.

The one or more training sample repositories 154 may function to store the corpus of labeled document samples. In a preferred embodiment, the one or more training sample repositories may be bifurcated into two distinct repositories in which a first repository may function to store in-scope labeled document samples and a second repository may function to store out-of-scope labeled document samples.

The seed/re-seed generator 155 may function to generate one or more document sourcing parameters for sourcing one or more corpora of document samples from a plurality of distinct sources of document samples. In some embodiments, the re-seed generator 155 may function to generate re-seeding sourcing parameters based on an evaluate of a pending corpus of document samples. That is, calculated corpus metrics and/or identified corpus deficiencies may inform a derivation of one or more seed sourcing parameters for a continued creation or build out of one or more corpus of document or image samples.

2. Methods for Configuring and Deploying a Machine Learning-Based File Metadata Classification Model As shown in FIG. 2, a method 200 for configuring and deploying a machine learning-based filename classification model includes constructing a digital file data corpus S210, transforming filename metadata of the digital file data corpus into tokenized filenames and capitalization-equivalent filenames S220, generating a filename vocabulary corpus and a filename feature corpus S230, generating one-hot encoded filename vectors S240, generating a corpus of labeled one-hot encoded filename vectors and training a machine learning-based filename classification model based on the corpus of labeled one-hot encoded filename vectors S250, and classifying inbound digital files via the trained machine learning-based filename classification model S260.

2.10 Constructing a Corpus of Digital File Data Samples

S210, which includes constructing a digital file data corpus, may function to construct a digital file data corpus that may include a plurality of distinct labeled digital file data samples. A labeled digital file data sample, as generally referred to herein, may optionally include a copy or an original of a distinct digital file, content data that may be contained in the distinct digital file, file metadata (e.g., filename, file size, file identifier, etc.) that may be associated with the distinct digital file, and/or one or more file classification labels corresponding to the file type of the distinct digital file. It shall be noted that a digital file may also be referred to as a "digital item", an "electronic file", a "digital computer file", or a "document".

In a first implementation, S210 may function to construct a digital file data corpus that may include a plurality of labeled digital file data samples that may collectively correspond to a plurality of distinct digital file types (e.g., resumes, invoices, applications, etc.). In one or more embodiments, the plurality of labeled digital file data samples may comprise a plurality of distinct sets of labeled digital file data samples, wherein each distinct set of labeled digital file data samples may correspond to a distinct file classification label. For instance, in a non-limiting example, S210 may function to construct a digital file data corpus that may include at least a first set of labeled digital file data samples that may correspond to a first file classification label (e.g., resume) and a second set of labeled digital file data samples that may correspond to a second file classification label (e.g., invoice).

In a second implementation, S210 may function to construct a digital file data corpus on a per file type or per file classification label basis. That is, in one or more embodiments of the second implementation, each labeled digital file data sample that may be included in a subject digital file data corpus may correspond to a single file type or single file classification label (e.g., all digital file data samples that may be included in the subject digital file data corpus may correspond to a single, distinct file type or single, distinct file classification label). For instance, in a non-limiting example, S210 may function to construct, via one or more computers, a (first) digital file data corpus that may only include labeled digital file data samples corresponding to a first file type or first file classification label (e.g., resume) and/or S210 may additionally function to construct a (second) digital file data corpus that may only include labeled digital file data samples corresponding to a second file type or second file classification label (e.g., invoice).

It shall be noted that, in one or more embodiments, a digital file that may be included in the digital file data corpus may be any one of a plurality of digital file formats including, but not limited to, a word open XML format document (DOCX) file format, a portable network graphics (PNG) file format, a joint photographic experts group (JPEP) file format, a portable document format (PDF), a tag image file format (TIFF), an MP3 file format, an MP4 file format, a waveform audio file format (WAV), or any other suitable digital file format.

Collecting Digital File Data Samples

In one or more embodiments of the first implementation and/or the second implementation, for each target digital file type, S210 may function to (e.g., automatically) source a plurality of distinct digital files corresponding to the target digital file type until a digital file quantity threshold may be satisfied. This is, in one or more embodiments, S210 may function to source (or collect) at least five distinct digital file data samples corresponding to a target document type, at least ten distinct digital file data samples corresponding to a target document type, at least fifteen distinct digital file data samples corresponding to a target document type, at least thirty distinct digital file data samples corresponding to a target document type, or any predetermined number of distinct digital file data samples that may satisfy the digital file quantity threshold.

2.20 Transforming Digital File Metadata into Tokenized File Metadata and Capitalization-Equivalent File Metadata S220, which includes transforming filename metadata, may function to transform or convert filename metadata included in the digital file data corpus into tokenized filenames and capitalization-equivalent filenames, as shown generally by way of example in FIG. 9. A tokenized filename, as generally referred to herein, may be a conversion of filename metadata (e.g., John_Doe_Resume.pdf) associated with a subject digital file of the digital file data corpus into lowercase filename tokens (e.g., [john, doe, resume, pdf]). A capitalization-equivalent filename or lowercase filename, as generally referred to herein, may be a conversion of filename metadata (e.g., John_Doe_Resume.pdf) of a subject digital file of the digital file data corpus, and more specifically, the alphabetic characters associated with the filename metadata to a consistent or uniform character capitalization, such as, all lowercase alphabetic characters (e.g., john_doe_resume.pdf).

As described in more detail herein, for each piece of filename metadata included in the digital file data corpus, S220 may function to generate a tokenized filename and a capitalization-equivalent filename (e.g., a lowercase filename) corresponding to a subject piece of filename metadata. That is, each subject filename of the digital file data corpus may be digitally mapped or linked to a tokenized filename (e.g., a tokenized filename representation) that may be a representation of a subject filename in a tokenized form and a capitalization-equivalent filename (e.g., capitalization-equivalent filename representation) that may be a representation of the subject filename in a uniform character-capitalization form.

2.20(i) Tokenizing Digital Filenames

In one or more embodiments, S220 may function to tokenize filenames (e.g., filename metadata) included in the digital file data corpus into tokenized filenames. In one or more embodiments, S220 may function to implement a tokenization engine that may function to receive, as input, a subject filename (e.g., John_Doe_Resume.pdf), process the subject filename according to one or more of a plurality of tokenization heuristics or instructions, and output a tokenized filename that may include a plurality of distinct filename tokens (e.g., [john, doe, resume, pdf]). In other words, S220 may function to tokenize (or segment or partition) a plurality of filename text strings into a plurality of distinct tokenized filenames that may include one or more filename tokens.

In a first implementation, S220 may function to individually or sequentially pass filename metadata associated with each distinct digital file of the digital file data corpus to a tokenization engine that may function to generate one or more tokenized filenames. For instance, in a non-limiting example, filename metadata associated with a first distinct digital file of the digital file data corpus may be converted to a (first) tokenized filename, filename metadata associated with a second distinct digital file of the digital file data corpus may be converted to a (second) distinct tokenized filename, and filename metadata associated with a third distinct digital file of the digital file data corpus may be converted to a (third) distinct tokenized filename. That is, in one or more embodiments, each filename included in the digital file data corpus may be an individual input to the tokenization engine that, when executed, may function to compute or generate a distinct tokenized filename (e.g., a distinct tokenized filename representation or the like).

It shall be noted that, in one or more embodiments, S220 may function to assign a file classification label to each generated tokenized filename that may be equivalent to the file classification label assigned to the filename and/or digital file in the digital file data corpus for which the tokenized filename corresponds.

In a second implementation, S220 may function to pass, in bulk, a list of filenames included in the digital file data corpus to the tokenization engine that may output a list of tokenized filenames. That is, in such implementation, the input into the tokenization engine may be a list of filenames that may include each filename included in the digital file data corpus and the output may be a corresponding list of tokenized filenames.

It shall be noted that in the first implementation and/or the second implementation, the tokenization engine may function to generate a tokenized filename based on evaluating each subject filename (e.g., each subject piece of filename metadata) against one or more tokenization heuristics and/or tokenization instructions, as described in more detail below.

Camel Case Tokenization

In one or more embodiments, one of the plurality of tokenization heuristics governing an operation of the tokenization engine may be a camel case heuristic. The camel case heuristic may be activated if the tokenization engine identifies a filename comprising a text string that includes one or more alphabetic characters that may be of a capitalization level equivalent to the first alphabetic character in the text string (e.g., JohnDoeResume). In such embodiments, S220 may function to generate a plurality of distinct filename tokens based on extracting the characters (of a subject filename text string) starting from the first alphabetic character in the filename text string up to, but not including, the next alphabetic character comprising a capitalization-level equivalent to the first alphabetic character, and similarly in analogous ways from the next alphabetic character up to, but not including, the next alphabetic character comprising a capitalization-level equivalent to the first alphabetic character or until the last character in the text string (e.g., John-DoeResume→[john, doe, resume]).

In another non-limiting example, the text string associated with a subject filename that may be passed to the tokenization engine may be "ITdepartment" and the tokenization engine, when executed, may function to segment or tokenize the filename into a first token "it", a second token "department", a third token "I", and a fourth token "tdepartment" (e.g., ITdepartment→[it, department, i, tdepartment]) as described in more detail herein. In another non-limiting example, the text string associated with a subject filename that may be passed to the tokenization engine may be "ITDepartment" and the tokenization engine, when executed, may function to segment or tokenize the filename into a first token "itd", a second token "epartment", a third token "IT", and a fourth token "department" (e.g., ITDepartment→[itd, epartment, IT, department]).

It shall be noted that the tokenization engine may function to iterate through a text string of a target filename when two or more alphabetic characters succeeding the first alphabetic character may be of a capitalization level equivalent to the first alphabetic character (e.g., JohnDoeResume→[john, doe, resume]).

Non-Alphabetic Tokenization

Additionally, or alternatively, in one or more embodiments, one of the plurality of tokenization heuristics that may be governing an operation of the tokenization engine may be a non-alphabetic tokenization heuristic. The non-alphabetic tokenization heuristic may be activated if the tokenization engine identifies a subject filename comprising a text string that includes one or more non-alphabetic characters. Accordingly, based on detecting the one or more non-alphabetic characters, the tokenization engine may function to iterate through the text string associated with the filename to generate one or more filename tokens.

For instance, in a non-limiting example, the text string passed to the tokenization engine may be "John_Doe_Resume" and the tokenization engine may function to generate a first distinct token (e.g., john) from the text string based on extracting the characters up to, but not including, the first non-alphabetic character, a second distinct token (e.g., doe) based on extracting the characters succeeding the first non-alphabetic character up to, but not including, the second non-alphabetic character, and a third distinct token (e.g., resume) based on extracting the characters succeeding the second non-alphabetic character to the last character in the text string (e.g., John_Doe_Resume→[john, doe, resume]).

Continuous Capitalization Tokenization

Additionally, or alternatively, in one or more embodiments, one of the plurality of tokenization heuristics and/or instructions that may be governing an operation of the tokenization engine may be a continuous capitalization heuristic. The continuous capitalization heuristic may be activated if the tokenization engine identifies a substring within a subject filename text string comprising at least two (2) continuous capital characters (e.g., at least two uppercase characters without a space therebetween). Accordingly, in response to detecting the at least two (2) continuous capital characters, the tokenization engine may function to iterate through the text string associated with the filename to generate one or more distinct filename tokens.

For instance, in a non-limiting example, the filename text string passed to the tokenization engine may be "ITdepartment" and the tokenization engine may function to generate a first distinct token (e.g., IT) from the filename text string based on extracting the continuous capital characters up to, but not including, the character capitalization inflection point (e.g., the transition point between the continuous capital characters and a lowercase character) and a second distinct token (e.g., department) based on extracting the characters succeeding the character capitalization inflection point to the last character in the filename text string or the next substring of continuous capitalization characters.

It shall be noted that S220 may function to delete and/or remove any duplicate tokens that may have been generated by the tokenization engine executing more than one tokenization heuristic against a subject filename or a subject piece of filename metadata. It shall be further noted that, in one or more preferred embodiments, the tokenization engine may function to convert the generated filename tokens into lowercase characters.

At least one technical advantage of S220 tokenizing filenames will become readily apparent in one or more downstream processes or operations.

2.20(ii) Generating Capitalization-Equivalent Filenames|Lowercase Filenames

In one or more embodiments, S220 may function to convert filenames that may be included in the digital file data corpus into capitalization-equivalent filenames. That is, in one or more embodiments, S220 may function to generate a capitalization-equivalent filename (e.g., lowercase filename) for each digital file of the digital file data corpus that may be associated with filename metadata. In other words, S220 may function to convert filenames comprising a text string that may include one or more uppercase alphabetical characters and/or one or more lowercase alphabetical characters to capitalization-equivalent filenames (e.g., filenames defined by lowercase alphabetical characters).

In one or more embodiments, S220 may function to generate a capitalization-equivalent filename (e.g., capitalization-equivalent filename representation) based on a filename identifying a target digital file. It shall be noted that generating a capitalization-equivalent filename may include implementing a capitalization-equivalent filename engine that may receive, as input, the filename of the target digital file and/or computing, via the capitalization-equivalent filename engine, the capitalization-equivalent filename based on one or more capitalization-equivalent instructions or heuristics of the capitalization-equivalent filename engine.

In a non-limiting example, filename metadata (e.g., JohnDoeResume.pdf) associated with a (first) distinct digital file of the digital file data corpus may be converted to a (first) lowercase filename or (first) capitalization-equivalent filename (e.g., johndoeresume.pdf), filename metadata (e.g., John_Doe_Resume.pdf) associated with a (second) distinct digital file of the digital file corpus may be converted to a (second) lowercase filename or (second) capitalization-equivalent filename (e.g., john_doe_resume.pdf), and filename metadata (e.g., John_Doe_Resume_2.pdf) associated with a (third) distinct digital file of the digital file corpus may be converted to a (third) lowercase filename or (third) capitalization-equivalent filename (e.g., john_doe_resume_2.pdf).

It shall be noted that, in one or more embodiments, S220 may function to assign a file classification label to each generated lowercase filename (e.g., capitalization-equivalent filename) that may be equivalent to the file classification label assigned to the subject filename and/or digital file in the digital file data corpus to which the lowercase filename (e.g., capitalization-equivalent filename) corresponds.

Figure 10:
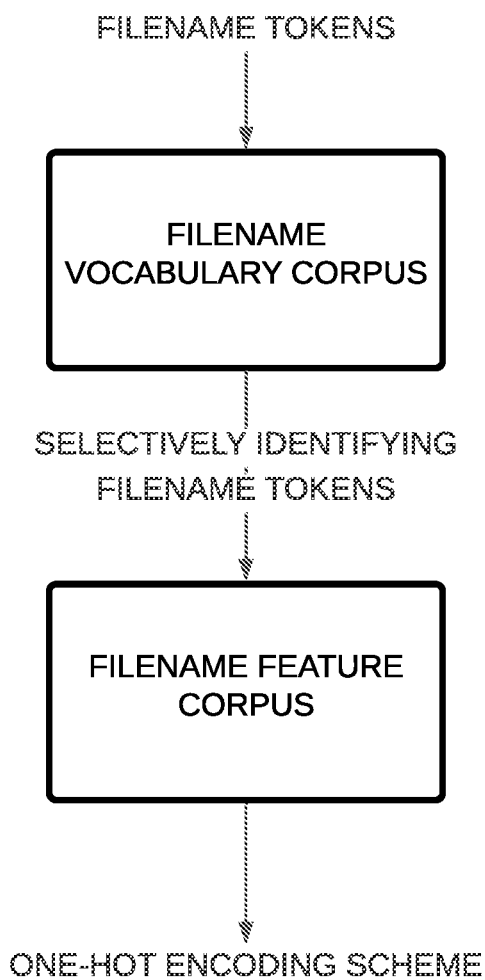
FIG. 10 illustrates a schematic representation of an example for generating a filename vocabulary corpus and a filename feature corpus in accordance with one or more embodiments of the present application.

2.30 Generating a File Metadata Vocabulary Corpus and a File Metadata Feature Corpus S230, which includes generating a file metadata vocabulary corpus and a file metadata feature corpus, may function to generate or construct a filename vocabulary corpus based on the tokenized filenames provided by S220 and may additionally function to derive a filename feature corpus based on the filename vocabulary corpus, as shown generally by way of example in FIG. 10. In one or more embodiments, S230 may function to automatically generate, by one or more computers, the filename vocabulary corpus based on the tokenized filenames provided by S220 and may additionally function to automatically derive, by the one or more computers, a filename feature corpus based on the filename vocabulary corpus.

Filename Vocabulary Corpus

In one or more embodiments, S230 may function to construct a filename vocabulary corpus that intelligently arranges the filename tokens associated with each of the tokenized filenames on a per file type or per file classification label basis. In such embodiments, the filename vocabulary corpus may include a plurality of distinct cumulative sets (or lists) of filename tokens, wherein each of the plurality of distinct cumulative sets (or lists) of filename tokens may be a representation of the entirety of (or all) the filename tokens corresponding to a distinct file type or distinct file classification label.

For instance, in a non-limiting example, the digital file data corpus may include a first plurality of digital files corresponding to a first file classification label, a second plurality of digital files corresponding to a second file classification label, and a third plurality of digital files corresponding a third file classification label. Each filename associated with the first plurality of digital files, the second plurality of digital files, and the third plurality of digital files may segmented or tokenized into a tokenized filename as described above. Accordingly, the filename vocabulary corpus may be constructed to include a first cumulative set (or list) of filename tokens corresponding to the first file classification label that includes all of the filename tokens corresponding to the first plurality of digital files, a second cumulative set (or list) of filename tokens corresponding to the second file classification label that includes all of the filename tokens corresponding to the second plurality of digital files, and a third set (or list) of filename tokens corresponding to the third filename classification label that includes all of the filename tokens corresponding to the third plurality of digital files.

In one or more embodiments, the (first) cumulative set (or list) of filename tokens corresponding to the first file classification label, the (second) cumulative set (or list) of filename tokens corresponding to the second file classification label, and the (third) set (or list) of filename tokens corresponding to the third file classification label may be a part of a broader set or list (e.g., the first set or list of filename tokens may be a first element in the broader set or list, the second set or list of filename tokens may be a second element in the broader set or list, and the third set or list of filename tokens may be a third element in the broader set or list).

Additionally, in one or more embodiments, S230 may function to compute and assign a token frequency value or score (e.g., a term frequency-inverse document frequency score (TF-IDF)) to each filename token included in a distinct cumulative set (or list) of filename tokens. In such embodiments, to compute TF-IDF scores, S230 may function to designate (or treat) each distinct cumulative set of filename tokens (e.g., each distinct set of filename tokens for each file type) as a "document" in the TF-IDF computation and the set of all filename tokens included in the filename vocabulary corpus as the "corpus" in the TF-IDF computation. A token frequency value or score may be a representation of the frequency that a subject filename token may appear in a target cumulative set (or list) of filename tokens.

Filename Feature Corpus

In one or more embodiments, S230 may function to derive a filename feature corpus based on the filename vocabulary corpus. In such embodiments, the filename feature corpus may include selective subsets of filename tokens from each distinct cumulative set (or list) of filename tokens of the filename vocabulary corpus that may be indicative of a digital file type or file classification label.

In a first implementation, S230 may function to define or set a term frequency-inverse document frequency threshold to selectively identify the filename tokens that may define the filename feature corpus. In such implementation, the filename tokens that satisfy the term frequency-inverse document frequency threshold may be included in the filename feature corpus. It shall be noted that, in one or more embodiments, the filename tokens included in the filename feature corpus may be referred to herein as "feature tokens", "filename search tokens", "search tokens" or the like.

In a second implementation, S230 may function to implement a feature quantity threshold that may be used to selectively identify a predetermined number of filename tokens, up to the feature quantity threshold, from each distinct cumulative set (or list) of filename tokens of the filename vocabulary corpus. In one or more embodiments, based on identifying the predetermined maximum number of filename tokens defined by the feature quantity threshold (e.g., six filename tokens, eight filename tokens, ten filename tokens, or any number of filename tokens), S230 may function to selectively identify from each distinct cumulative set of filename tokens, a plurality of filename tokens having the highest TF-IDF scores up to the feature quantity threshold.

Additionally, or optionally, S230 may function to surface or expose, via a graphical user interface or the like, the filename feature corpus to an analyst of the data handling and data governance service to evaluate the feature tokens and replace and/or remove any feature tokens included in the filename feature corpus that may be caused by bias in the digital file data corpus constructed by S210.

Expansion of the Filename Feature Corpus

Additionally, or optionally, in one or more embodiments, S230 may function to augment the filename feature corpus by including one or more semantically similar tokens for one or more of the feature tokens included in the filename feature corpus. For instance, in a non-limiting example, S230 may function to identify that a feature token included in the filename feature corpus may be "resume" for classifying resume-type files, thus, S230 may function to augment the filename feature corpus to include one or more semantically similar tokens for the feature token "resume" such as "CV" and "curriculum vitae."

It shall be noted that, for each subject feature token included in the filename feature corpus, S230 may function to source additional digital files with filename metadata that includes the subject feature token and the corresponding file classification label(s) to expand the digital file data corpus. In one or more embodiments, S230 may function to automatically source additional digital files as described in U.S. patent application Ser. No. 17/968,929, filed on 19 Oct. 2022, titled SYSTEMS AND METHODS FOR AUTO- MATICALLY SOURCING CORPORA OF TRAINING AND TESTING DATA SAMPLES FOR TRAINING AND TESTING A MACHINE LEARNING MODEL, which is incorporated herein in its entirety by this reference. In one or more embodiments, the above-mentioned steps may be iteratively repeated based on the updated or expanded state of the digital file data corpus.

It shall be noted that, in one or more embodiments, each distinct filename feature token of the filename feature corpus may be set and/or used as a learnable feature in a machine learning-based filename classification model once trained.

2.40 Generating One-Hot Encoded File Metadata Vectors

S240, which includes generating one-hot encoded file metadata vectors, may function to construct (or generate) one or more one-hot encoded filename vectors based on the filename feature corpus constructed by S230. In one or more embodiments, S240 may function to automatically construct, via one or more computers, a plurality of distinct one-hot encoded filename vectors based on the filename feature corpus and/or the corpus of digital file data samples provided by S210.

Generating One-Hot Encoded Filename Vectors

Figure 11:
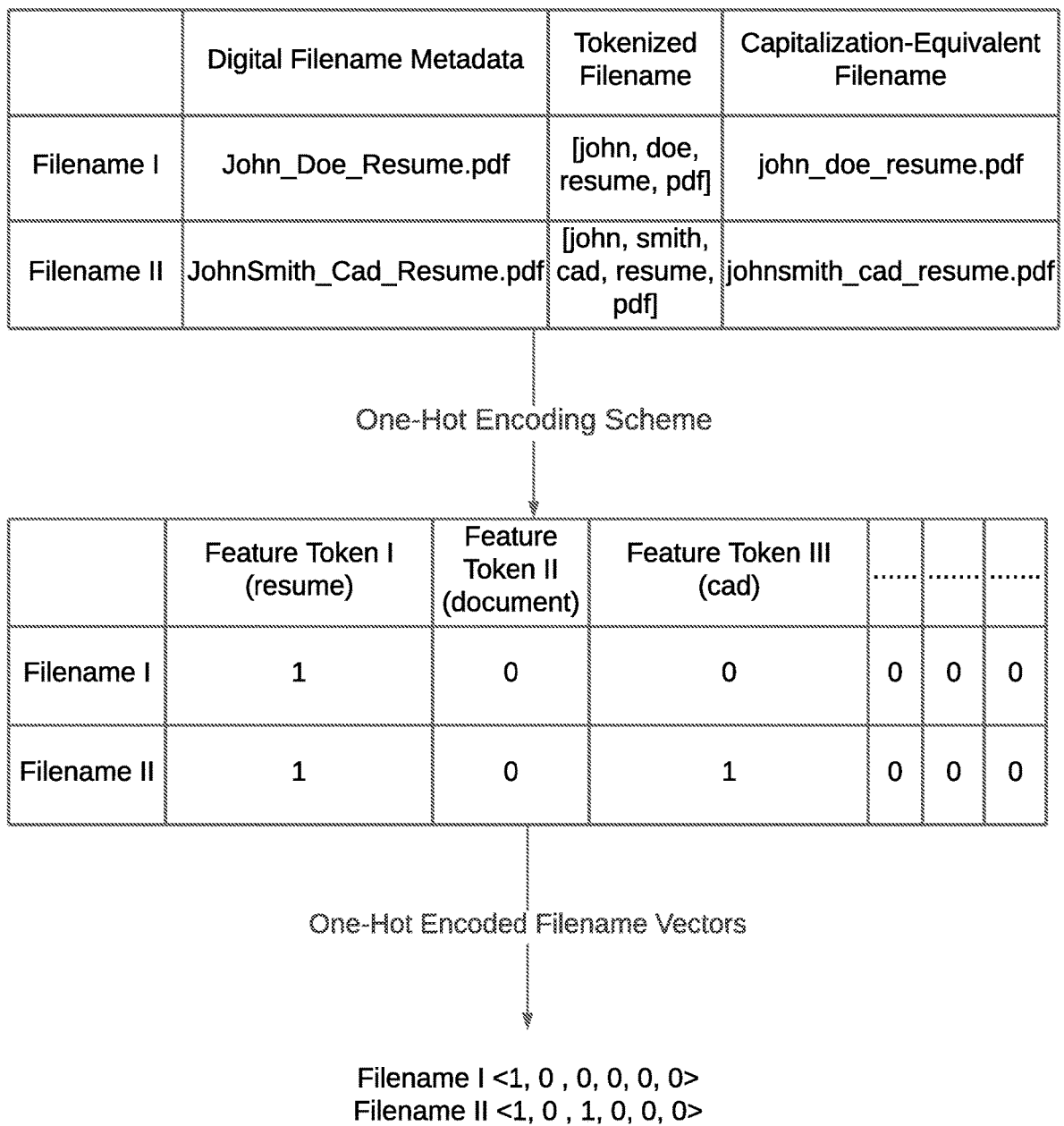
FIG. 11 illustrates a schematic representation of an example for generating one or more one-hot encoded filename vectors based on a one-hot encoding scheme in accordance with one or more embodiments of the present application.

In one or more embodiments, S240 may function to generate one-hot encoded filename vectors in accordance with a one-hot encoding scheme (e.g., a one-hot encoding filename scheme, a one-hot filename encoding scheme, or the like), as shown generally by way of example in FIG. 11. The one-hot encoding scheme may define one-hot encoding criteria from which one-hot encoded filename vectors may be generated. Each generated one-hot encoded filename vector may include a plurality of distinct elements (e.g., values, etc.) indexed according to the one-hot encoding scheme, and more specifically, the one-hot encoding criteria. It shall be noted that each distinct element of a generated one-hot encoded filename vector may include or be encoded to include a numerical value (e.g., a zero (0) or a one (1)) indicating whether a one-hot encoding criterion of the one-hot encoding scheme may have been satisfied.

In one or more embodiments, S240 may function to generate a distinct one-hot encoded filename vector for each (e.g., distinct) filename (e.g., each piece of filename metadata) included in the digital file data corpus. That is, for n-number of filenames that may correspond to n-number of digital files included in the digital file data corpus, S240 may function to generate n-number of one-hot encoded filename vectors.

As described in more detail herein, in one or more embodiments, to determine if one-hot encoding criteria for a target filename may be satisfied, S240 may function to assess and/or search a tokenized filename and/or a lowercase filename (e.g., capitalization-equivalent filename) associated with the target filename based on evaluating each element of the one-hot encoding criteria against a token length threshold. For instance, in a non-limiting example, when a feature token of the one-hot encoding scheme is below a token length threshold, S240 may function to search the tokenized filename for the feature token to determine if an exact (token) match exists in the tokenized filename. Conversely, when a feature token of the one-hot encoding scheme is above the token length threshold, S240 may function to search a lowercase filename for the feature token to determine if a (token) substring match exists in the lowercase filename.

Stated another way, in one or more embodiments, a one-hot encoding filename scheme may include a plurality of distinct filename tokens of the filename feature corpus. In such embodiments, S240 may function to (e.g., automatically) assess or evaluate, via one or more computers, a target capitalization-equivalent filename representation against each distinct filename feature token of the one-hot encoding filename scheme that is greater than or equal to a predetermined feature token length threshold (e.g., one (1), two (2), three (3), four (4), five (5), six (6), seven (7), or any suitable number). Additionally, or alternatively, in such embodiments, S240 may function to (e.g., automatically) assess, via one or more computers, a target tokenized filename representation against each distinct filename feature token of the one-hot encoding filename scheme that is less than the predetermined filename feature token length.

It shall be noted that, in one or more embodiments, assessing a capitalization-equivalent filename representation against filename feature tokens of the one-hot encoding scheme that may be greater than or equal to a predetermined filename feature token length threshold may include (e.g., automatically) performing, via one or more computers, one or more searches of the capitalization-equivalent filename representation to determine if a (e.g., corresponding) token substring is present in the capitalization-equivalent filename representation for each distinct filename feature token greater than or equal to the predetermined filename feature token length threshold. It shall be further noted that, in one or more embodiments, assessing a tokenized filename representation against the filename feature tokens of the one-hot encoding filename scheme that may be less than the predetermined filename feature token length threshold may include (e.g., automatically) performing, via one or more computers, one or more searches of the tokenized filename representation to determine if a (e.g., corresponding) exact token match occurrence exists or occurs in the tokenized filename representation for each distinct filename feature token less than the predetermined filename feature token length threshold.

In one or more embodiments, the token length threshold may be set based on the classes of tokens and/or the model used for tokenizing (e.g., the tokenization engine). Additionally, or alternatively, in one or more embodiments, the token length threshold may include multiple threshold ranges that may overlap (e.g., token length >3 and token length <4).

One-Hot Encoding Scheme Comprising Filename Feature Tokens

In a first implementation, generating a plurality of distinct one-hot encoded filename vectors may include evaluating each of a plurality of distinct filenames (or each of a plurality of distinct pieces of filename metadata) against a one-hot encoding scheme that may include the plurality of feature tokens (e.g., search tokens or the like) of the filename feature corpus. In one or more embodiments of the first implementation, each of the plurality of distinct feature tokens of the filename feature corpus may define distinct token occurrence criterion as described in more detail herein. In a non-limiting example, a one-hot encoding scheme or a one-hot filename encoding scheme may include an indexed list of feature tokens such as, "resume", "document", and "cad" that the plurality of filenames may be evaluated against.

In one or more embodiments, S240 may function to individually evaluate a tokenized filename and/or a lowercase filename corresponding to a target filename (or a target piece of filename metadata) of the digital file data corpus to determine whether each of the plurality of feature tokens of the one-hot encoding scheme occurred (or existed) in the target filename. That is, in one or more embodiments, S240 may function to search a lowercase filename (e.g., capitalization-equivalent filename) corresponding to a target filename under evaluation for feature tokens of the one-hot encoding scheme that may exceed a predetermined string length (or predetermined character length) threshold, and S240 may function to search a tokenized filename corresponding to the target filename under evaluation for feature tokens of the one-hot encoding scheme that may be below a predetermined string length (or predetermined character length) threshold.

For instance, in a non-limiting example, S240 may function to evaluate a filename included in the digital file data corpus titled "John_Doe_Resume.pdf" against each feature token included in the above-mentioned exemplary one-hot encoding scheme. In such non-limiting example, S240 may function to search the feature token "resume" of the above-mentioned exemplary one-hot encoding scheme in the lowercase filename (e.g., john_doe_resume.pdf) corresponding to the filename titled "John_Doe_Resume.pdf" to determine if a substring of "resume" may occur (or exist) in the lowercase filename because the feature token "resume" may have exceeded a token length threshold (e.g., greater than or equal to four (4) characters). Further, S240 may function to search the feature token "document" of the above-mentioned exemplary one-hot encoding scheme in the lowercase filename (e.g., john_doe_resume.pdf) corresponding to the filename titled "John_Doe_Resume.pdf" to determine if a substring of "document" may occur (or exist) in the lowercase filename because the feature token "document" may have exceeded the token length threshold. Furthermore, S240 may function to search the feature token "cad" of the above-mentioned exemplary one-hot encoding scheme in the tokenized filename (e.g., [john, doe, resume, pdf]) corresponding to the filename titled "John_Doe_Resume.pdf" to determine if the feature token "cad" may occur (or exist) in the tokenized filename (e.g., exact token match or the like) because the filename feature token "cad" may have been less than the token length threshold.

Accordingly, in such first implementation, based on the evaluation of the subject filename, S240 may function to generate a distinct one-hot encoded filename vector corresponding to the subject filename. For instance, based on the above-mentioned evaluation, S240 may function to generate a one-hot encoded filename vector, such as "<1, 0, 0>" corresponding to the filename titled "John_Doe_Resume.pdf" because the token occurrence criterion for the feature token "resume" was satisfied (e.g., first element), the token occurrence criterion for the feature token "document" was not satisfied (e.g., second element), and the token occurrence criterion for the feature token "cad" was not satisfied (e.g., third element). In one or more embodiments, the length of a generated one-hot encoded filename vector (e.g., the number of elements in the one-hot encoded vector) may be greater than or at least equal to the quantity of feature tokens of the one-hot encoding scheme.

One-Hot Encoding Scheme Comprising Filename Feature Tokens+One or More Additional Indicative One-Hot Encoding Signals Additionally, in one or more embodiments of the first implementation, generating a plurality of distinct one-hot encoded filename vectors may include evaluating a plurality of distinct filenames against a one-hot encoding scheme that may include the plurality of feature tokens of the filename corpus and one or more additional indicative one-hot encoding signals described in more detail herein.

One-Hot Encoding Signals|Gerund

Additionally, or alternatively, in one or more embodiments, S240 may function to individually evaluate a tokenized filename corresponding to a subject filename of the digital file data corpus to determine if one or more tokens of the tokenized filename may be in the form of a gerund. For instance, with continuing reference to the above non-limiting example, S240 may function to search a tokenized filename or a tokenized filename corpus, such as, [john, doe, resume, pdf] that may correspond to the filename titled "John_Doe_Resume.pdf" to determine if one or more tokens of the tokenized filename ends with "ing".

Accordingly, in one or more embodiments, S240 may function to generate a one-hot encoded filename vector, such as "<1, 0, 0, 0>" corresponding to the filename titled "John_Doe_Resume.pdf" because the token occurrence criterion for the feature token "resume" was satisfied (e.g., first element), the token occurrence criterion for the feature token "document" was not satisfied (e.g., second element), the token occurrence criterion for the feature token "cad" was not satisfied (e.g., third element), and the token occurrence criteria for identifying a gerund-type token was not satisfied (e.g., fourth element).

One-Hot Encoding Signals|Time-Informative Substring

Additionally, or alternatively, in one or more embodiments, S240 may function to individually evaluate the lowercase filename (e.g., capitalization-equivalent filename) corresponding to a subject filename to determine if the lowercase filename includes a time-informative substring. For instance, with continued reference to the above non-limiting example, S240 may function to search a lowercase filename, such as, "john_doe_resume.pdf" corresponding to the filename titled "John_Doe_Resume.pdf" to determine if one or more time-informative substrings (e.g., q1, q2, q3, q4, 1q, 2q, 3q, or 4q) may occur (or exist) in the lowercase filename.

Accordingly, in one or more embodiments, S240 may function to generate a one-hot encoded filename vector, such as "<1, 0, 0, 0, 0>" corresponding to the filename titled "John_Doe_Resume.pdf" because the token occurrence criterion for the feature token "resume" was satisfied (e.g., first element), the token occurrence criterion for the feature token "document" was not satisfied (e.g., second element), the token occurrence criterion for the feature token "cad" was not satisfied (e.g., third element), the token occurrence criteria for identifying a gerund-type token was not satisfied (e.g., fourth element), and the occurrence criteria for identifying a time-informative substring token was not satisfied (e.g., fifth element).

One-Hot Encoding Signals|Accounting-Informative Substring

In one or more embodiments, S240 may function to individually evaluate the lowercase filename corresponding to a subject filename to determine if the lowercase filename (e.g., capitalization-equivalent filename) includes an accounting-informative substring. For instance, with continued reference to the above non-limiting example, S240 may function to search a lowercase filename, such as, "john_doe_resume.pdf corresponding to the filename titled "John_Doe_Resume.pdf" to determine if one or more accounting-informative substrings (e.g., 'ss-4', 'w-2', 'w-4', 'c-ez', 'k-1', '1120S', 'w-10', '1120-w', '1040-sr', '1099-misc', '1099-g', '1099-k', '1099-int', '1099-div', '1095-a') may occur (or exist) in the lowercase filename.

Accordingly, in one or more embodiments, S240 may function to generate a one-hot encoded filename vector, such as "<1, 0, 0, 0, 0, 0>" corresponding to the filename titled "John_Doe_Resume.pdf" because the token occurrence criterion for the feature token "resume" was satisfied (e.g., first element), the token occurrence criterion for the feature token "document" was not satisfied (e.g., second element), the token occurrence criterion for the feature token "cad" was not satisfied (e.g., third element), the token occurrence criteria for identifying a gerund-type token was not satisfied (e.g., fourth element), the occurrence criteria for identifying a time-informative substring token was not satisfied (e.g., fifth element), and the occurrence criteria for identifying an accounting-informative substring token was not satisfied (e.g., sixth element)

One-Hot Encoding Signals|Token Signal Strength

Additionally, or alternatively, in one or more embodiments, S240 may function to evaluate, on a per filename bias, the cumulative character length or string length of all tokens that may have satisfied token (or string) occurrence criteria against the character length (or string length) of the lowercase filename to determine a token signal strength.

In one or more embodiments, a token occurrence criteria of the token signal strength may be satisfied if the cumulative character length or string length for all tokens that satisfied token occurrence criteria divided by the character length (or string length) of the lowercase filename corresponding to the subject filename may be greater than or equal to a pre-determined token signal strength threshold (e.g., greater than or equal to 35%, greater than or equal to 40%, greater than or equal to 50%, greater than or equal to 60%, greater than or equal to 70%, greater than or equal to 80%, greater than or equal to 90%, greater than or equal to 95%, etc.). For instance, with continuing reference to the above non-limiting example, the character length (or string length) of the filename titled "john_doe_resume.pdf may be of length nineteen (19) and the cumulative total of all tokens that satisfied token occurrence criteria may be of length six (6), and thus, in some embodiments, the token occurrence criteria of the token signal strength may not have been satisfied because 31.5% is less than a predetermined token signal threshold of 75%.

Accordingly, with continued reference to the above-mentioned example, S240 may function to generate a one-hot encoded filename vector, such as "<1, 0, 0, 0, 0, 0, 0>" corresponding to the filename titled "John_Doe_Resume.pdf" because the token occurrence criterion for the feature token "resume" was satisfied (e.g., first element), the token occurrence criterion for the feature token "document" was not satisfied (e.g., second element), the token occurrence criterion for the feature token "cad" was not satisfied (e.g., third element), the token occurrence criteria for identifying a gerund-type token was not satisfied (e.g., fourth element), the occurrence criteria for identifying a time-informative substring token was not satisfied (e.g., fifth element), the occurrence criteria for identifying an accounting-informative substring token was not satisfied (e.g., sixth element), and the occurrence criteria for identifying the token signal strength was not satisfied (e.g., seventh element).

2.50 Intelligently Generating a Training Corpus of Labeled One-Hot Encoded Filename Vectors and Training a Machine Learning-Based Filename Classification Model S250, which includes generating a corpus of labeled one-hot encoded filename vectors and training a machine learning-based filename classification model, may function to train the machine learning-based filename classification model based on the corpus of labeled one-hot encoded filename vectors and one or more hyperparameters. In one or more embodiments, S250 may function to automatically generate, via one or more computers, the corpus of labeled one-hot encoded filename vectors and train, via the one or more computers, a machine learning-based filename classification model based on the corpus of labeled one-hot encoded filename vectors. Corpus of Labeled One-Hot Encoded Filename Vectors In one or more embodiments, S250 may function to generate one or more corpora of labeled one-hot encoded filename vectors based on the one-hot encoded filename vectors generated by S240.

In one or more embodiments, S250 may function to generate a corpus of one-hot encoded filename vectors that includes each of the plurality of one-hot encoded filename vectors generated by S240. Additionally, in such embodiments, each one-hot encoded filename vector may be assigned a file classification label equivalent to the file classification label assigned to the subject filename or digital file in the digital file data corpus to which a subject one-hot encoded filename vector corresponds.

Accordingly, in one or embodiments, the corpus of one-hot encoded filename vectors may include a plurality of one-hot encoded file name vectors that may collectively correspond to a plurality of distinct file classification labels.

Additionally, or alternatively, in one or more embodiments, S250 may function to intelligently and/or automatically generate the corpus of one-hot encoded filename vectors based on tokenizing each of a plurality of distinct filenames of a target filename corpus (e.g., the above-mentioned filename corpus, a corpus of filenames comprising the plurality of distinct filenames) in analogous ways as described above. It shall be noted that the plurality of distinct filenames may collectively correspond to a plurality of distinct document types (e.g., resume-type documents, application-type documents, invoice-type documents, etc.). Accordingly, in such embodiments, S250 may function to (e.g., automatically) construct or generate, by one or more computers, a distinct cumulative set (or list) of filename tokens for each distinct document or file type of the plurality of distinct document types (e.g., a first cumulative set (or list) of filename tokens may correspond to a first document type that includes all of the filename tokens corresponding to the first document type, a second cumulative set (or list) of filename tokens may correspond to a second document type that includes all of the filename tokens corresponding to the second document type, etc.). It shall be noted that, in one or more embodiments, each distinct cumulative set (or list) of filename tokens may include the entirety of filename tokens (including duplicates) of a distinct document type, distinct file type or a distinct file classification label to which the cumulative set or list corresponds.

Additionally, or alternatively, in some embodiments, S250 may function to compute and assign a token frequency value or score (e.g., a term frequency-inverse document frequency score (TF-IDF)) to each filename token included in a distinct cumulative set (or list) of filename tokens. Accordingly, in such embodiments, S250 may function to define or set a term frequency-inverse document frequency threshold to identify the filename tokens and/or search tokens that may define a one-hot encoding filename scheme that may be used to encode or generate one-hot encoded filename vectors (e.g., the one-hot encoding filename scheme may include filename tokens associated with a plurality of distinct document or file types). In such implementation, the filename tokens or search tokens that satisfy the term frequency-inverse document frequency threshold may be included in the one-hot encoding filename scheme.

Under Sampling of One-Hot Encoded Filename Vectors

Additionally, or optionally, in some embodiments, if the corpus of one-hot encoded filename vectors include a total quantity of one-hot encoded filenames vectors of a subject file classification label type that may be of one or more magnitudes greater than the total quantity of one-hot encoded filename vectors of the least represented file classification label (e.g., greater than ix, greater than 2×, greater than 3×, greater than 4×, greater than 5×, greater than 6×, etc.), S250 may function to under sample the plurality of one-hot encoded filename vectors of the subject file classification type. In a first implementation, S250 may function to under sample the one-hot encoded filename vectors of the subject file classification label type using an edited nearest neighbors algorithm until a predetermined magnitude threshold between the quantity of one-hot encoded filename vectors of the subject file classification label type and the quantity of one-hot encoded filename vectors of the least represented file classification label may be satisfied.

In a second implementation, S250 may function to under sample the one-hot encoded filename vectors of the subject file classification label type by randomly removing one or more one-hot encoded filename vectors of the subject file classification type until a predetermined magnitude threshold between the quantity of one-hot encoded filename vectors of the subject file classification label type and the quantity of one-hot encoded filename vectors of the least represented file classification label may be satisfied.

Defining Hyperparameters

In one or more embodiments, S250 may function to define one or more hyperparameters before training the machine learning-based filename classification model.

In one or more embodiments, S250 may function to define an objective function for improving one or more efficacy metrics of the filename classification model and that may relate to an overall goal for training the machine learning-based filename classification model. In a first implementation, S250 may function to define an objective function that maximizes the number of true positives out of the total number of digital file classification inferences to be greater than a target precision threshold (e.g., 95%). In this first implementation, S250 may enabling a tuning of one or more hyperparameters (e.g., learning rate, batch sies, and/or the like) that optimize the objective function.

Additionally, or alternatively, in a second implementation, S250 may function to define an objective function that minimizes the number of false negatives out of the total number of digital file classification inferences to be lower than a target precision threshold (e.g., 5%).

Training a Machine Learning-Based Filename Classification Model

In one or more embodiments, S250 may function to train a machine learning-based filename classification model (e.g., an XGB classifier or the like) based on the one or more corpora of labeled one-hot encoded filename vectors and the one or more hyperparameters. In such embodiments, S250 may function to train the machine learning-based filename classification model on labeled one-hot encoded filename vectors from the corpus of labeled one-hot encoded filename vectors that satisfy one or more token (or string) occurrence criteria. That is, in one or more embodiments, each training sample used during a training of the machine learning-based filename classification model includes at least one nonzero entry (e.g., <1, 0, 0, 0, 0>, 1, 0, 0, 0, 1>, <1, 1, 0, 1, 0>, <0, 0, 0, 0, 1>, etc.).

2.60 Classifying Inbound Digital Files

S260, which includes classifying inbound digital files, may function to route one or more inbound digital files to a machine learning-based filename classification model to fast-classify the one or more inbound digital files. Additionally, or optionally, S260 may function to route a subset of the one or more inbound digital files to an alternative (or enhanced) digital file classification model if the machine learning-based filename classification model generates a classification inference below a confidence content threshold value for each of the one or more digital files in the subset.

Figure 12:
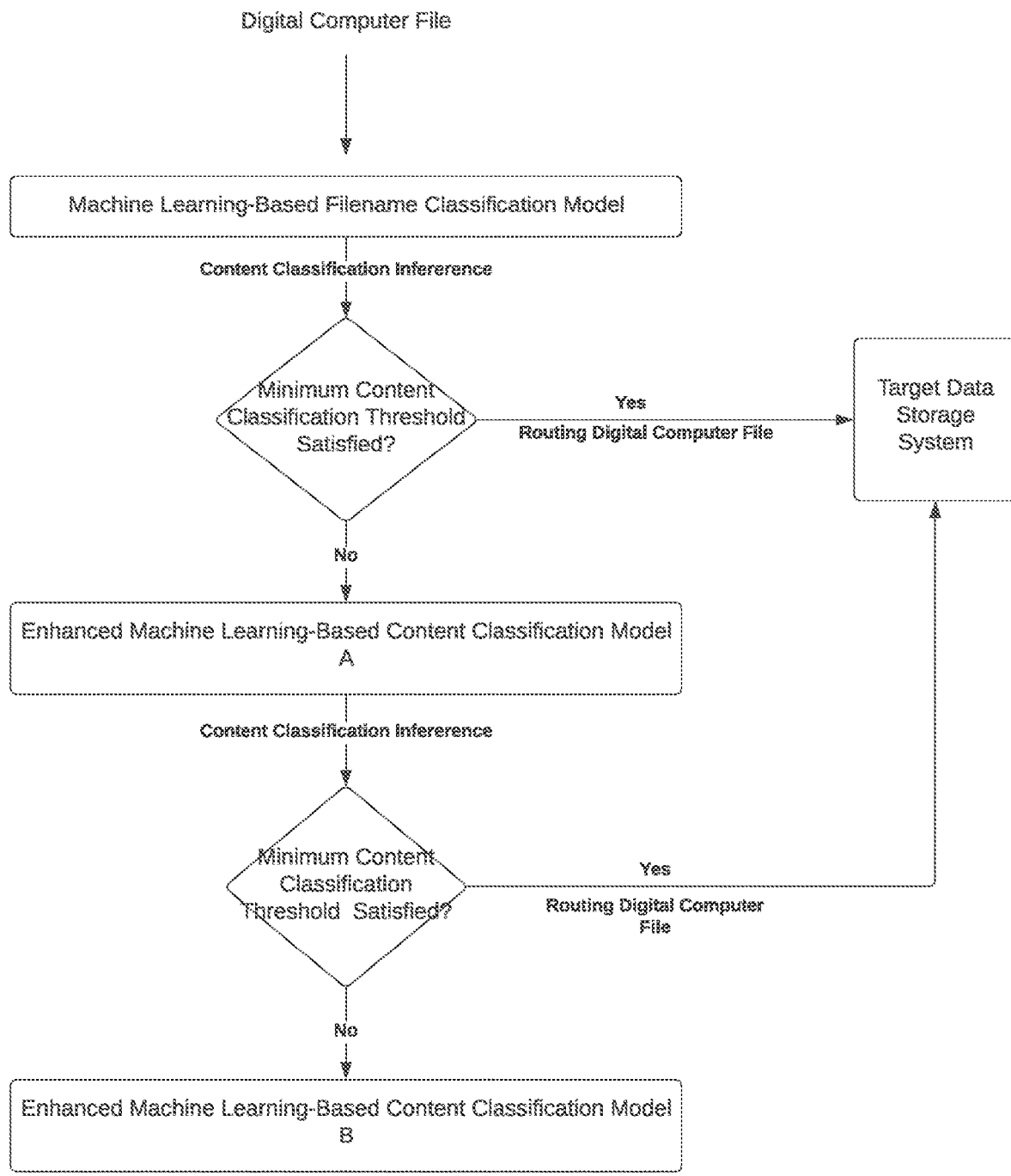
FIG. 12 illustrates a schematic representation of an example for sequentially routing a digital computer file to one or more machine learning-based content classification models in accordance with one or more embodiments of the present application.

In one or more embodiments, based on identifying a digital file (e.g., digital computer file or the like) associated with a subscriber to the data handling and data governance service, S260 may function to sequentially route the digital computer file to one or more machine learning-based content classification models of a plurality of distinct machine learning-based content classification models based on a service-defined model instantiation and execution sequence in which the model instantiation and execution sequence defines a model instantiation and execution order for the plurality of distinct machine learning-based content classification models that enables a fast content classification of the digital computer file (e.g., minimizing a computation time or runtime of the one or more machine learning-based content classification models needed to classify the digital computer file), as shown generally by way of example in FIG. 12. In one or more embodiments, the model instantiation and execution order for the plurality of distinct machine learning-based content classification models may include the machine learning-based filename classification model at a foremost position (e.g., $1^{st}$ position) in the service-defined model instantiation and execution sequence, a hierarchical classification model at a position downstream of the foremost position (e.g., $2^{nd}$ or $3^{rd}$ position), and an enhanced machine learning-based document classification model at a position downstream of the foremost position (e.g., $2^{nd}$ or $3^{rd}$ position).

It shall be recognized that, in one or more embodiments, the machine learning-based filename classifier may be considered a lightweight classifier relative to various other content classifiers based on having a less computationally complex algorithmic structure that may enable a faster computation of a content classification inference.

Routing Inbound Digital Files to a Machine Learning-Based Filename Classifier

In one or more embodiments, S260 may function to classify inbound digital files via a production-implemented (machine learning-based) filename classification model of the data handling and data governance service. In such embodiments, for each inbound digital file, S260 may function to classify (or attempt to classify) a subject inbound digital file into a specific file type category based on the filename metadata corresponding to the subject inbound digital file.

Figure 13:
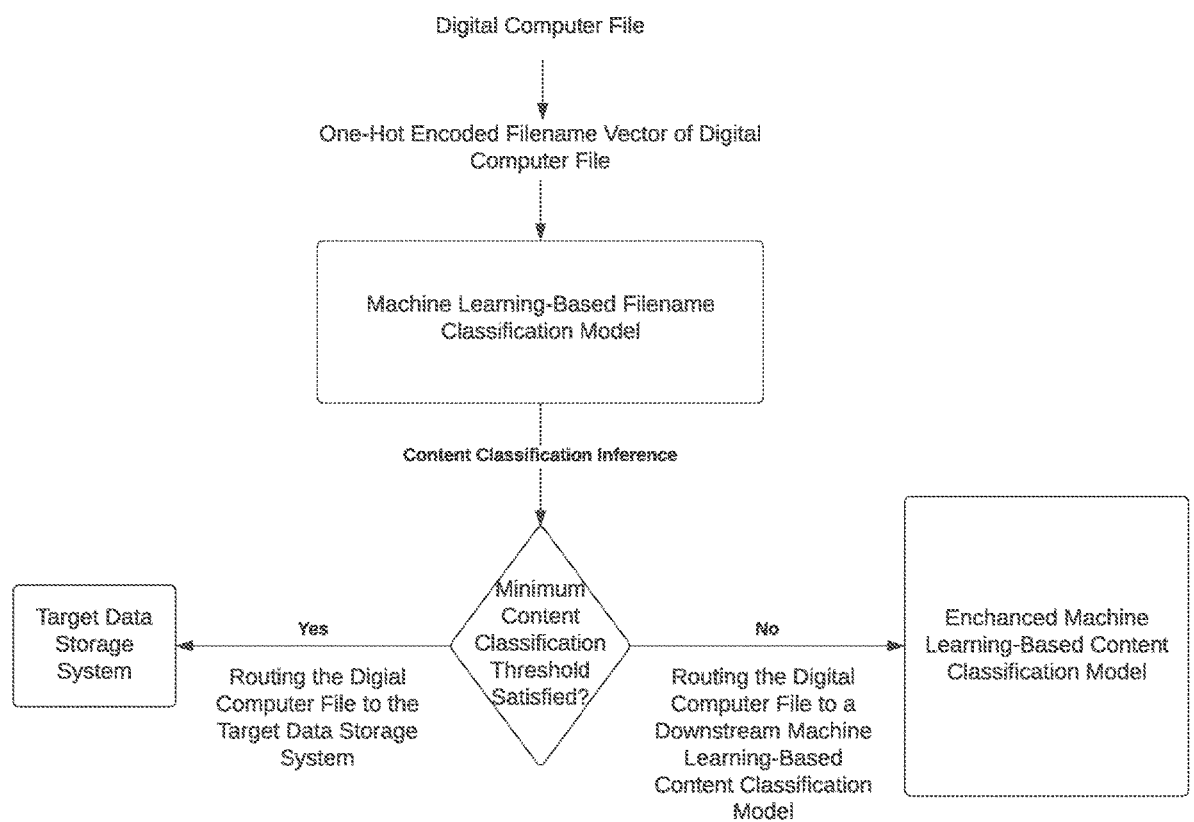
FIG. 13 illustrates a schematic representation of an example for implementing a machine learning-based filename classification model in accordance with one or more embodiments of the present application.

Accordingly, in one or more embodiments, for each distinct inbound digital file, S260 may function to generate a distinct one-hot encoded filename vector in analogous ways as described above and pass a generated one-hot encoded filename vector to the production-implemented (machine learning-based) filename classification model to compute a classification inference, as shown generally by way of example in FIG. 13. It shall be noted that, in one or more embodiments, the machine learning-based filename classification model may be a subscriber-agnostic filename classification model that is configured to classify the digital computer file into one of a plurality of distinct subscriber-agnostic digital file subdomain types based on the extracted filename feature data of the digital computer file or a subscriber-specific machine learning-based filename classification model that is configured to classify the digital computer file into any one of the plurality of distinct subscriber-agnostic digital file subdomain types and a plurality of distinct subscriber-informed digital file subdomain types based on the extracted filename feature data of the digital computer file, as described in U.S. patent application Ser. No. 17/991,330, filed on 21 Nov. 2022, titled SYSTEMS AND METHODS FOR SUBSCRIBER-BASED ADAPTATION OF PRODUCTION-IMPLEMENTED MACHINE LEARNING MODELS OF A SERVICE PROVIDER USING A TRAINING APPLICATION, which is incorporated herein in its entirety by this reference.

It shall be further noted that, in one or more embodiments, if a content confidence score or value corresponding to a content classification inference (e.g., a content confidence value associated with a content classification inference) for a subject digital file is below a predetermined confidence score threshold (e.g., a minimum content classification inference threshold), S260 may function to forego classifying the subject digital file using the production-implemented (machine learning-based) filename classification model and may route the digital file to an alternative machine learning-based digital file classification model (e.g., an enhanced machine learning-based document classification model).

It shall be further noted that, in one or more embodiments, S260 may function to migrate a subject digital file to a target data storage repository if the content confidence value associated with a subject classification inference for the subject digital file satisfies the minimum content classification threshold.

Accordingly, in one or more embodiments, S260 may function to automatically identify, via one or more computers, that a fast classification or fast content classification of a subject digital computer file is successful based on determining that a content confidence value associated with a content classification inference computed by the machine learning-based filename classification model for the subject digital file satisfies the minimum content classification threshold which, in turn, may cause an automatic termination of a routing of the digital computer file to one or more subsequent machine learning-based content classification models downstream of the machine learning-based filename classification model in the service-defined model instantiation and execution sequence based on the identifying.

Stated another way, in one or more embodiments, S260 may function to automatically identify that a fast content classification of a subject digital computer file is successful based on determining that a content confidence value of a content classification inference computed by the machine learning-based filename classification model for the subject digital computer file satisfies the minimum content classification threshold. In such embodiments, S260 may function to automatically exit the service-defined model instantiation and execution sequence based on the identifying which may include bypassing and/or avoiding instantiating and executing a set of machine learning-based content classification models subsequent or downstream of the machine learning-based filename classification model in the service-defined model instantiation and execution sequence.

Routing Inbound Digital Files to a Hierarchical Digital File Classifier

In one or more embodiments, based on the production-implemented (machine learning-based) filename classification model foregoing classifying a subject digital file, S260 may function to route the subject digital file to a hierarchical digital file classification model of the data handling and data governance service (e.g., the hierarchical digital file classification model is a downstream or subsequent classification model in a service-defined model instantiation and execution sequence). In one or more embodiments, the hierarchal file classification model may function to classify (or attempt to classify) a subject digital file into a coarse or broad top-level file domain category rather than into a specific file type category.

In one or more embodiments, the hierarchal file classification model of the data handling and data governance service may define a classification system comprising a plurality of distinct file domain classification categories and a plurality of distinct file subdomain classification categories underlying each of the plurality of distinct file domain classification categories. For instance, in a non-limiting example, a digital file subdomain classification category (e.g., job application), a second digital file subdomain classification category (e.g., school application), a third digital file subdomain classification category (e.g., loan application) may be an increased granular classification category of a first digital file domain classification category (e.g., application).

Accordingly, via the hierarchal file classification model, S260 may function to aggregate each of the file classification subdomain classification categories or digital file subdomain types computed by the production-implemented (machine learning-based) filename classification model and sum the corresponding confidence score for each of the file classification label predictions on a per digital file domain classification category basis.

Accordingly, in one or more embodiments, if the aggregated confidence score exceeds a predetermined confidence score threshold for one of the plurality digital file domain classification categories, S260 may function label the subject digital file with a classification label corresponding to the one of the plurality of digital file domain classification categories.

Routing Inbound Digital Files to the Doc Type Classifier Ensemble

In one or more embodiments, based on the (production-implemented) filename classification model foregoing classifying a subject digital file, S260 may function to route the subject digital file to one or more of a plurality of machine learning-based classification models that may function to attempt a classification of the subject digital file based on the content data included within the subject digital file rather than solely based on the filename metadata, as described in U.S. Patent Application 63/215,203, filed on 25 Jun. 2021, titled SYSTEMS AND METHODS FOR INTELLIGENT DIGITAL ITEM DISCOVERY AND MACHINE LEARNING-INFORMED HANDLING OF DIGITAL ITEMS AND DIGITAL ITEM GOVERNANCE, which is incorporated herein in its entirety by this reference.

Stated differently, in one or more embodiments, S260 may function to route the subject digital file (e.g., digital computer file) to a subsequent machine learning-based content classification model as defined by the service-defined model instantiation and execution sequence if a content confidence value associated with a content classification inference for the subject digital file fails to satisfy a minimum content classification threshold.

Routing Inbound Digital Files to a Bidirectional Encoded Representation Transformer (BERT)

In one or more embodiments, S260 may function to classify inbound digital files by implementing or using a bidirectional encoder representation form transformers (BERT) model or the like. In such embodiments, for each distinct inbound digital file, S260 may function to route a raw filename and/or a lowercase filename associated with each distinct inbound digital file to the bidirectional encoder representation form transformer model to classify each distinct inbound digital file into a specific file type category.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As a person skilled in the art will recognize from the previous detailed description and from the figures and claims, modifications and changes can be made to the preferred embodiments of the invention without departing from the scope of this invention defined in the following claims.

We claim:

1. A machine learning-based method for accelerated content classification and routing of digital files in a data handling and data governance service, the method comprising:

identifying a digital computer file associated with a subscriber to the data handling and data governance service;

sequentially routing the digital computer file to one or more machine learning-based content classification models of a plurality of distinct machine learning-based content classification models based on a service-defined model instantiation and execution sequence, wherein:

(i) the service-defined model instantiation and execution sequence defines a model instantiation and execution order for the plurality of distinct machine learning-based content classification models that enables a fast content classification of the digital computer file while minimizing a computation time or runtime of the one or more machine learning-based content classification models; and (ii) the one or more machine learning-based content classification models include a machine learning-based filename classification model;

computing, via the machine learning-based filename classification model, a content classification inference based on extracted filename feature data of the digital computer file; and executing one or more computer-executable instructions based on the content classification inference, wherein executing the one or more computer-executable instructions includes one of:

(a) a routing of the digital computer file to a subsequent machine learning-based content classification model based on the service-defined model instantiation and execution sequence when a content confidence value associated with the content classification inference fails to satisfy a minimum content classification threshold; and (b) a migration of the digital computer file to a target data storage repository when the content confidence value satisfies the minimum content classification threshold.

2. The method according to claim 1, wherein:

the extracted filename feature data comprises one or more features extracted from a filename identifying the digital computer file;

computing the content classification inference includes:
 converting the extracted filename feature data to a filename vector representation; and
 providing the filename vector representation as model input to the machine learning-based filename classification model.

3. The method according to claim 1, wherein:

the machine learning-based filename classification model is configured to classify the digital computer file into one of a plurality of distinct digital file subdomain types; and each of the plurality of distinct digital file subdomain types is associated with a top-level digital file domain type.

4. The method according to claim 1, wherein the model instantiation and execution order for the plurality of distinct machine learning-based content classification models includes:

the machine learning-based filename classification model at a foremost position in the service-defined model instantiation and execution sequence;

a machine learning-based hierarchical classification model at a position downstream of the foremost position; and an enhanced machine learning-based document classification model at a position downstream of the foremost position.

5. The method according to claim 1, wherein
the machine learning-based filename classification model comprises one of:
   a subscriber-agnostic filename classification model that is configured to classify the digital computer file into one of a plurality of distinct subscriber-agnostic digital file subdomain types based on the extracted filename feature data of the digital computer file; and
   a subscriber-specific machine learning-based filename classification model that is configured to classify the digital computer file into any one of the plurality of distinct subscriber-agnostic digital file subdomain types and a plurality of distinct subscriber-informed digital file subdomain types based on the extracted filename feature data of the digital computer file.

6. The method according to claim 1, wherein:
the machine learning-based filename classification model is the first machine learning-based content classification model of the plurality of distinct machine learning-based content classification models to be instantiated and executed in the service-defined model instantiation and execution sequence.

7. The method according to claim 6, further comprising:
automatically identifying that the fast content classification of the digital computer file is successful based on determining that the content confidence value of the content classification inference computed by the machine learning-based filename classification model satisfies the minimum content classification threshold; and
automatically terminating a routing of the digital computer file to one or more subsequent machine learning-based content classification models downstream of the machine learning-based filename classification model in the service-defined model instantiation and execution sequence based on the identifying.

8. The method according to claim 6, further comprising:
automatically identifying that the fast content classification of the digital computer file is successful based on determining that the content confidence value of the content classification inference computed by the machine learning-based filename classification model satisfies the minimum content classification threshold; and
automatically exiting the service-defined model instantiation and execution sequence based on the identifying, wherein:
   the exiting of the service-defined model instantiation and execution sequence bypasses or avoids instantiating and executing a set of machine learning-based content classification models subsequent or downstream of the machine learning-based filename classification model in the service-defined model instantiation and execution sequence.

9. A computer-implemented method for accelerated content classification and routing of digital files in a data handling and data governance service, the method comprising:
   identifying, by one or more computers, a digital computer file associated with a subscriber to the data handling and data governance service;
   routing, by the one or more computers, the digital computer file to one or more machine learning-based content classification models of a plurality of distinct machine learning-based content classification models based on a service-defined model instantiation and execution sequence, wherein:
      (i) the service-defined model instantiation and execution sequence defines a model instantiation and execution order for the plurality of distinct machine learning-based content classification models that enables a fast classification of the digital computer file; and
      (ii) the one or more machine learning-based content classification models include a machine learning-based filename classification model;
   computing, via the machine learning-based filename classification model, a content classification inference based on extracted filename feature data of the digital computer file; and
   executing, by the one or more computers, one or more computer-executable instructions based on the content classification inference, wherein executing the one or more computer-executable instructions includes one of:
      (a) escalating the digital computer file to an enhanced machine learning-based content classification model subsequent to the machine learning-based filename classification model in the service-defined model instantiation and execution sequence when a content confidence value associated with the content classification inference fails to satisfy a minimum content classification threshold; and
      (b) disposing of the digital computer file into a target data storage repository when the content confidence value satisfies the minimum content classification threshold.

10. The computer-implemented method according to claim 9, further comprising:
   adjusting the minimum content classification threshold from a service-default minimum content classification threshold to a subscriber-informed minimum content classification threshold based on receiving an input from the subscriber that corresponds to increasing or decreasing the service-default minimum content classification threshold.

* * * * *